(12) United States Patent  (10) Patent No.: US 7,500,410 B2
Tsuji  (45) Date of Patent: Mar. 10, 2009

(54) TRANSMISSION FOR A TRACTOR

(75) Inventor: Kenichiro Tsuji, Sakai (JP)

(73) Assignee: Kubota Corporation, Osaka (JP)

( * ) Notice: Subject to any disclaimer, the term of this patent is extended or adjusted under 35 U.S.C. 154(b) by 337 days.

(21) Appl. No.: 11/368,349

(22) Filed: Mar. 3, 2006

(65) Prior Publication Data

US 2006/0243513 A1 Nov. 2, 2006

(30) Foreign Application Priority Data

Apr. 27, 2005 (JP) ............................. 2005-130428
Jun. 2, 2005 (JP) ............................. 2005-163113

(51) Int. Cl.
*F16H 3/08* (2006.01)
*B60K 17/00* (2006.01)
(52) U.S. Cl. ..................... 74/325; 180/344; 180/900
(58) Field of Classification Search ................ 74/325; 180/344, 364, 368, 900
See application file for complete search history.

(56) References Cited

U.S. PATENT DOCUMENTS

| | | | | |
|---|---|---|---|---|
| 3,106,273 | A | * | 10/1963 | Doerfer et al. ............. 192/221 |
| 3,149,498 | A | * | 9/1964 | Mack ........................... 74/364 |
| 3,374,681 | A | * | 3/1968 | Hugh et al. ................ 74/15.66 |
| 3,552,232 | A | * | 1/1971 | Kress ......................... 475/130 |
| 4,148,382 | A | | 4/1979 | Yamaoka et al. |
| 4,463,622 | A | | 8/1984 | Freiburger |
| 4,782,714 | A | | 11/1988 | Schletzbaum et al. |
| 5,526,711 | A | | 6/1996 | Stine |
| 5,573,471 | A | * | 11/1996 | Shubinsky et al. .......... 475/207 |
| 7,273,441 | B2 | * | 9/2007 | Okabe et al. ................ 477/120 |
| 2005/0101426 | A1 | | 5/2005 | Sugino et al. |

FOREIGN PATENT DOCUMENTS

| | | |
|---|---|---|
| GB | 2096251 | 10/1982 |
| JP | 4-107348 | 4/1992 |
| JP | 4107348 | 4/1992 |
| JP | 2000-158958 | 6/2000 |
| JP | 2002021951 | 1/2002 |
| JP | 2003130150 | 5/2003 |
| JP | 2007078160 A * | 3/2007 |

OTHER PUBLICATIONS

Spanish Search Report dated Feb. 29, 2008.

* cited by examiner

*Primary Examiner*—Tisha D Lewis
(74) *Attorney, Agent, or Firm*—The Webb Law Firm

(57) ABSTRACT

A transmission for a tractor having a change speed device operable when an engine and the transmission are connected to transmit, in varied speeds, power from the engine to a driving wheel, a main drive shaft for receiving power from the engine when the engine and the transmission are connected, and a reverse and forward drive switching device disposed between the engine and the change speed device operable to switch a direction of rotation of power from the engine. The reverse and forward drive switching device being shiftable between a high-speed forward drive position, a low-speed forward drive position, and a reverse drive position, and including a high-speed forward drive clutch, a low-speed forward drive clutch, and a reverse drive clutch wherein each clutch is mounted on the main drive shaft for switching the reverse and forward drive switching device to each respective clutch drive position.

8 Claims, 25 Drawing Sheets

FIG.16
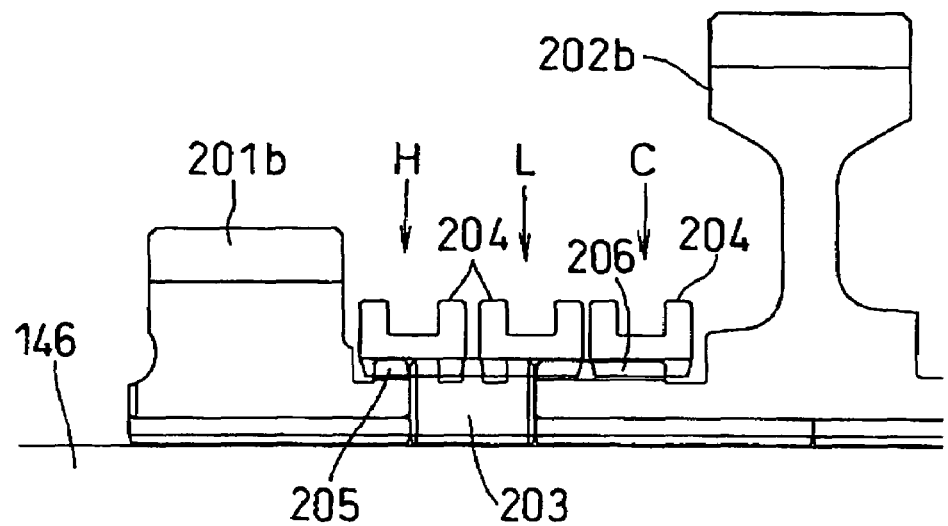
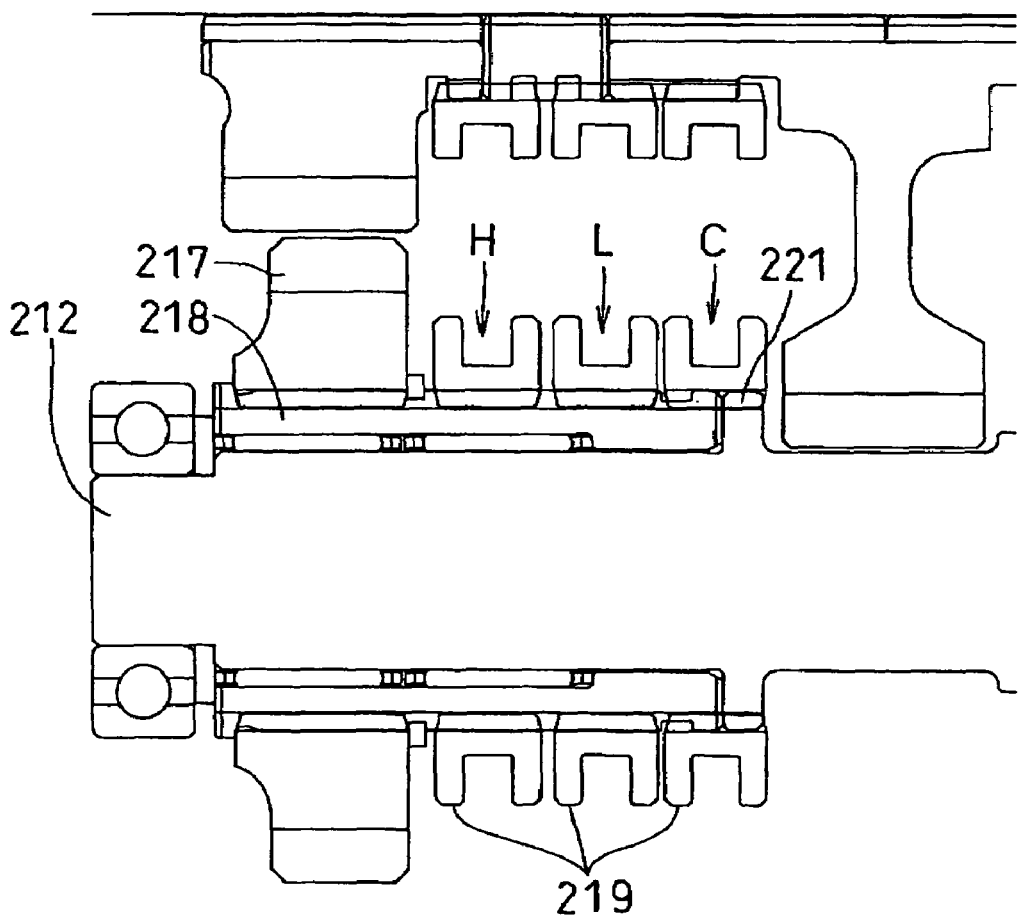

TRANSMISSION FOR A TRACTOR

BACKGROUND OF THE INVENTION

This invention relates to a transmission for a tractor.

A known power transmission system of a tractor includes a change speed device that changes the speed of power from an engine for transmission to drive wheels, a reverse and forward drive switching device (sometimes referred to as shuttle shift) disposed between the engine and change speed device for switching a rotating direction of the power. The reverse and forward drive switching device can change forward drive to two, high and low, speeds, and includes a high-speed forward drive clutch for switching the power from the engine to a forward high speed, a low-speed forward drive clutch for switching the power to a forward low speed, and a reverse drive clutch for switching the power to reverse drive. These clutches are in the form of wet type multi-disk hydraulic clutches (see Publication JP4-107348 of Japanese Patent Application).

In this power transmission system, the high-speed forward drive clutch is mounted on a main drive shaft directly coupled to an engine output shaft. The low-speed forward drive clutch and reverse drive clutch are mounted on a counter shaft disposed below the main drive shaft.

Each wet type multi-disk hydraulic clutch is constructed to transmit power by supplying pressure oil to the back of a piston to move the piston and press drive plates and clutch disks against a pressure plate. An oil passage for feeding the pressure oil to the back of the piston is formed in the shaft on which clutch is mounted.

In the conventional power transmission system noted above, the high-speed forward drive clutch is mounted on the main drive shaft, and the low-speed forward drive clutch and reverse drive clutch on the counter shaft. The oil passages for supplying pressure oil must be formed in the respective shafts. Thus, there is room for improvement in design.

SUMMARY OF THE INVENTION

Having regard to the drawback of the prior art noted above, the object of this invention is to provide an improved power transmission system for a tractor.

The above object is fulfilled, according to this invention, by a transmission for a tractor comprising:

a change speed device operable, when an engine and the transmission of the tractor are connected, to transmit, in varied speeds, power from the engine to driving wheel;

a main drive shaft for receiving the power from the engine when the engine of the tractor and the transmission are connected; and a reverse and forward drive switching device disposed between the engine and the change speed device to be operable, when the engine of the tractor and the transmission are connected, to switch a direction of rotation of the power from the engine, the reverse and forward drive switching device being shiftable between a high-speed forward drive position and a low-speed forward drive position, and a reverse drive position, and including:

a high-speed forward drive clutch mounted to the main drive shaft for switching the reverse and forward drive switching device to the high-speed forward drive position;

a low-speed forward drive clutch mounted to the main drive shaft for switching the reverse and forward drive switching device to the low-speed forward drive position; and a reverse drive clutch on the main drive shaft for switching the reverse and forward drive switching device to the reverse drive position.

Since the high-speed forward drive clutch, low-speed reverse drive clutch, and forward drive clutch are all supported on one shaft, the structure for operating the clutches, for example, oil passage may be simplified when hydraulic power is used to operate the clutches.

BRIEF DESCRIPTION OF THE DRAWINGS

FIG. 7 is a sectional rear view of a clutch housing, a cover and so on;

FIG. 16 is an enlarged sectional view of shift portions of the auxiliary change speed device and creep change speed device;

DETAILED DESCRIPTION OF PREFERRED EMBODIMENTS

Embodiments of this. invention will be described hereinafter with reference to the drawings.

While this invention includes a plurality of embodiments, a particular characteristic feature of one embodiment may be applied to the other embodiments within the scope of the invention unless this constitutes an inconsistency.

Figure 2:
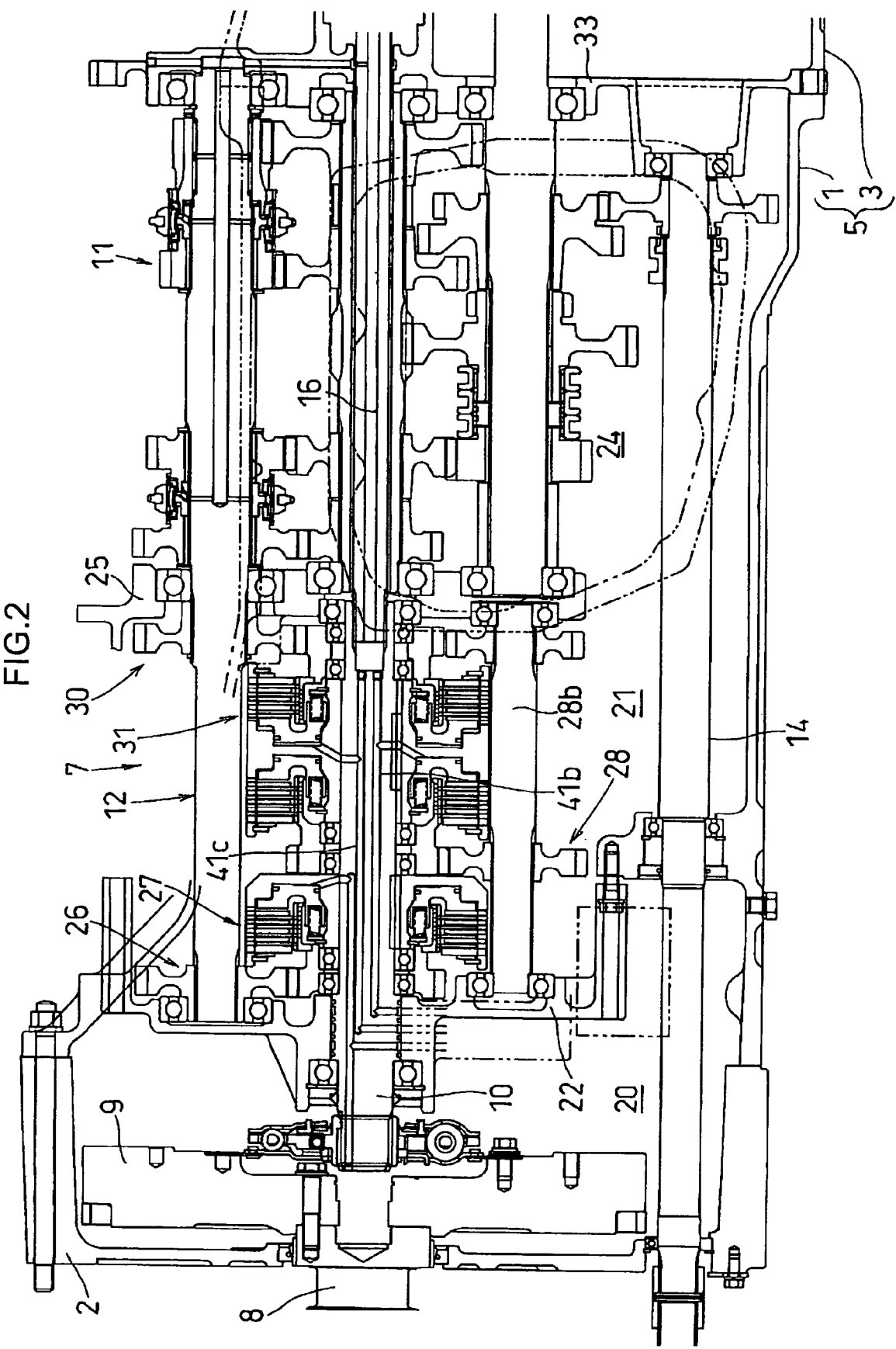
FIG. 2 is a sectional side view of a forward portion of a power transmission system.
Figure 3:
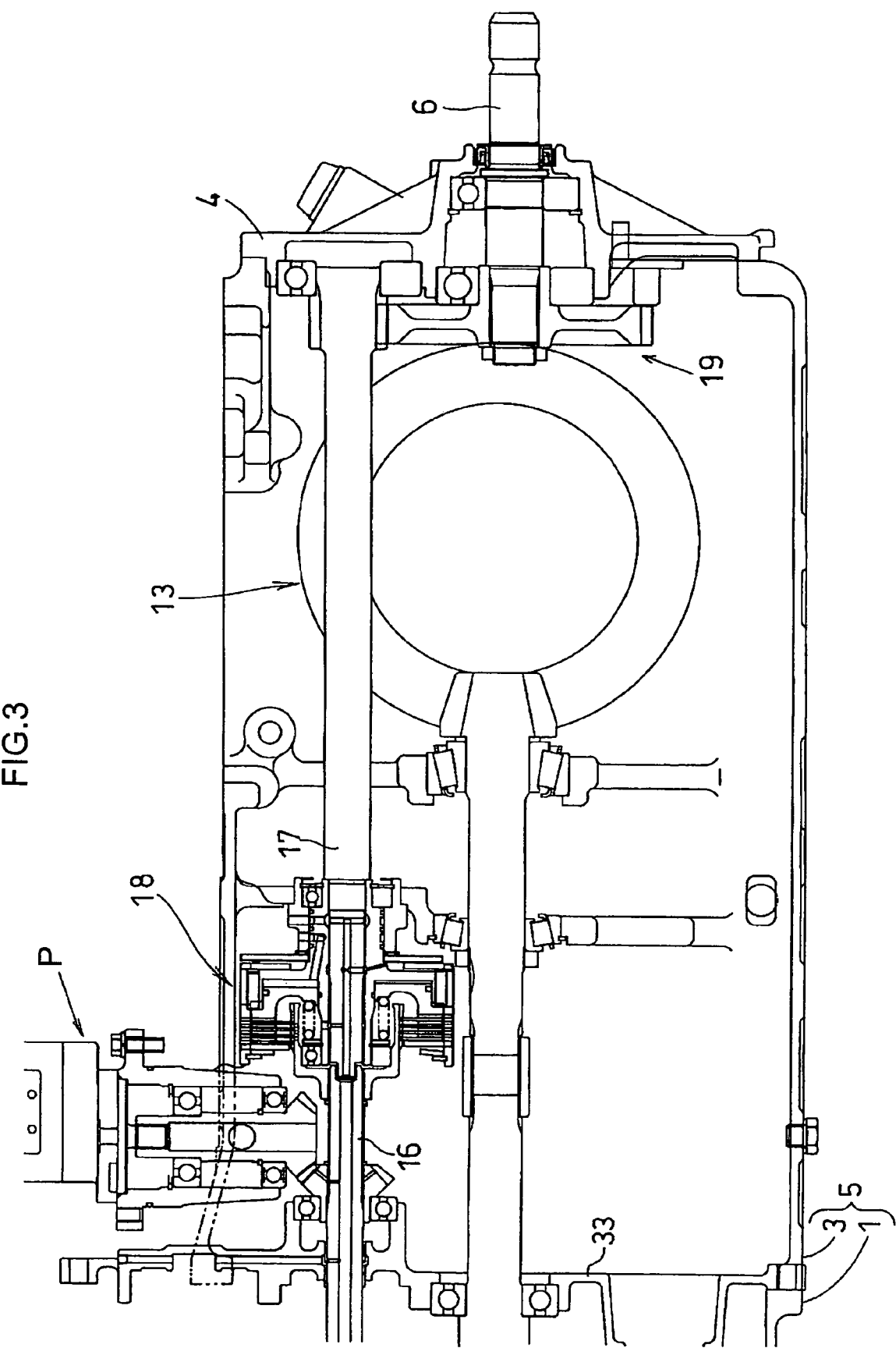
FIG. 3 is a sectional side view of a rearward portion of the power transmission system.

In FIG. 2, numeral 1 denotes a clutch housing. The clutch housing 1 is connected to the rear end of a flywheel housing 2 connected to the rear end of an engine. In FIG. 3, numeral 3 denotes a transmission case connected to the rear end of the clutch housing 1. The transmission case 3 has a rear end opening closed with a rear cover 4.

The above clutch housing (front case) 1 and transmission case (rear case) 3 constitute a drive case 5 forming part of a tractor body. The tractor body has this drive case 5, the engine and flywheel housing 2 as main components thereof.

The drive case 5 houses a power transmission system 7 including a propelling power transmitting line for transmitting power from the engine to drive wheels, and a PTO power transmitting line for transmitting power to a PTO shaft 6.

The propelling line of the power transmission system 7 includes a main drive shaft 10 for receiving power transmitted from an engine crankshaft 8 through a flywheel 9, a change speed device 11 for changing speed of the power from the main drive shaft 10 for transmission to the rear wheels (drive wheels) and so on, a reverse and forward drive switching device (shuttle mechanism) 12 for switching the direction of rotation of the power transmitted from the main drive shaft 10 to the change speed device 11 to switch the tractor between forward movement and backward movement, a rear wheel differential 13 for transmitting power from the change speed device 11 to the right and left rear wheels, and a front wheel main drive shaft 14 for transmitting power from the change speed device 11 to front wheels (drive wheels).

The main drive shaft 10 and front wheel main drive shaft 14 have axes extending in the fore and aft direction.

The PTO line of the power transmission system 7 includes a PTO drive shaft 16 directly and coaxially coupled to the rear of the main drive shaft 10, a PTO transmission shaft 17 disposed rearwardly of and coaxially with the PTO drive shaft 16, a PTO clutch 18 for making and breaking power transmission from the PTO drive shaft 16 to the PTO transmission shaft 17, and a reduction device (PTO change speed mechanism) 19 for transmitting power, in deceleration, from the PTO transmission shaft 17 to the PTO shaft 6.

The clutch housing 1 has a first chamber 20 for accommodating the flywheel 9, and a second chamber 21 for accommodating the reverse and forward drive switching device 12. A forward portion of the main drive shaft 10 is supported through a bearing by a partition wall 22 between the first chamber 20 and second chamber 21. A rearward portion of the main drive shaft 10 is supported through a bearing by a partition wall 25 between the second chamber 21 and a third chamber 24 of the clutch housing 1 accommodating the change speed device 11.

Figure 1:
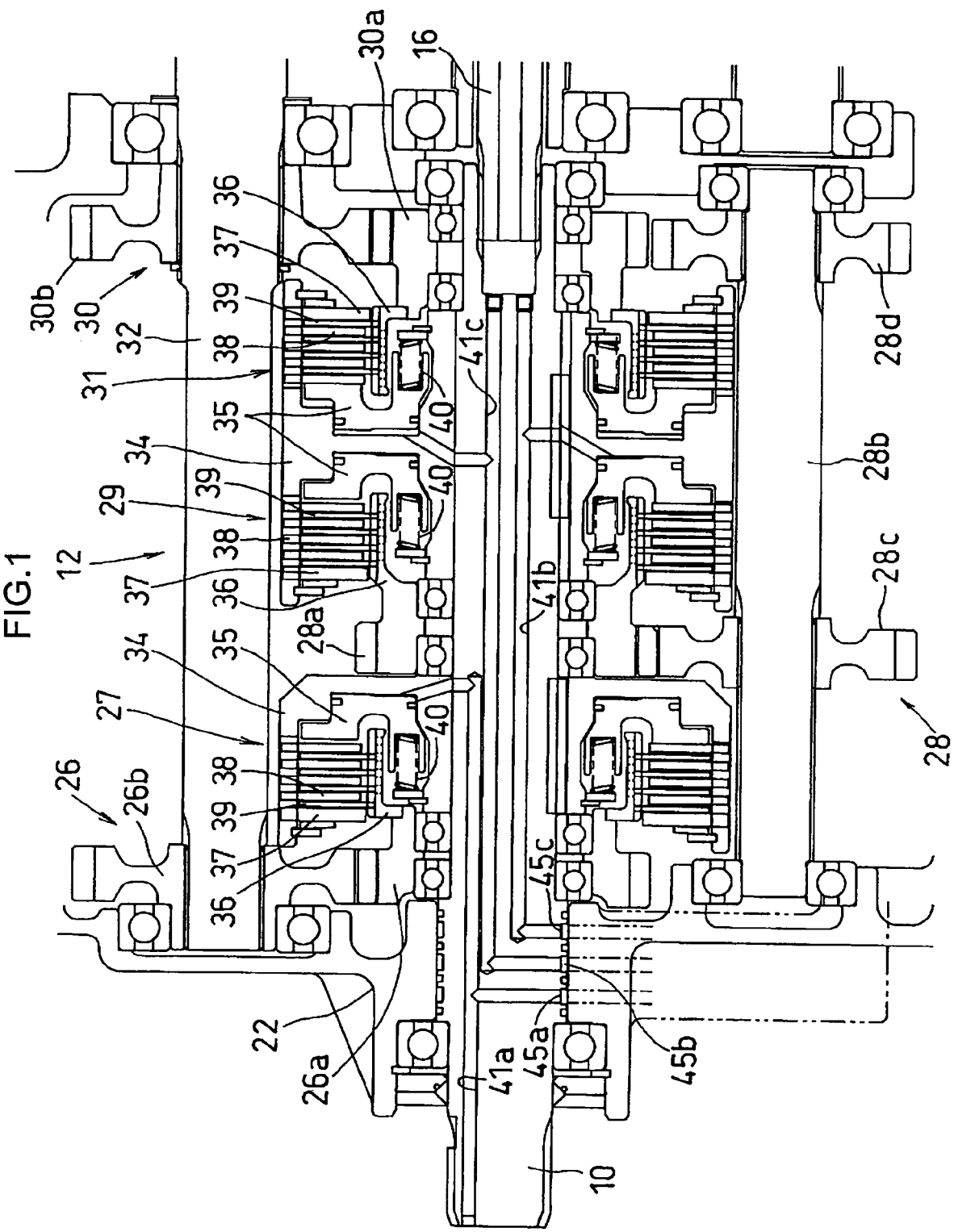
FIG. 1 is a developed view showing a side section of a reverse and forward drive switching device according to this invention.

As shown in FIGS. 1 and 2, the reverse and forward drive switching device 12 can switch the direction of rotation of the power from the main drive shaft 10 to transmit forward drive or reverse drive to the change speed device 11, and can output the forward drive in two speeds. FIG. 1 is a developed view.

The positions seen in the axial direction of the main drive shaft 10, and an input shaft 32 and a reverse drive transmission shaft 28b described hereinafter, are in the positions of shafts 16, 129 and 144 shown in FIG. 7, respectively. Thus, the input shaft 32 is disposed parallel to the main drive shaft 10 and laterally of a position between the main drive shaft 10 and reverse drive transmission shaft 28b.

The reverse and forward drive switching device 12 includes a high-speed forward drive gear train 26 for transmitting high-speed forward drive from the main drive shaft 10 to the change speed device 11, a high-speed forward drive clutch 27 for making and breaking power transmission to the high-speed forward drive gear train 26, a reverse drive gear mechanism 28 for transmitting reverse drive from the main drive shaft 10 to the change speed device 11, a reverse drive clutch 29 for making and breaking power transmission to the reverse drive gear mechanism 28, a low-speed forward drive gear train 30 for transmitting low-speed forward drive from the main drive shaft 10 to the change speed device 11, a low-speed forward drive clutch 31 for making and breaking power transmission to the low-speed forward drive gear train 30.

The high-speed forward drive gear train 26 includes a high-speed forward drive output gear 26a mounted on the main drive shaft 10 to be rotatable relative thereto, and a first input gear 26b mounted on the input shaft 32 of the change speed device 11 to be rotatable therewith and meshed with the high-speed forward drive output gear 26a for inputting power to the change speed device 11.

The low-speed forward drive gear train 30 includes a low-speed forward drive output gear 30a mounted on the main drive shaft 10 to be rotatable relative thereto, and a second input gear 30b mounted on the input shaft 32 of the change speed device 11 to be rotatable therewith and meshed with the low-speed forward drive output gear 30a for inputting power to the change speed device 11.

The reverse drive gear mechanism 28 includes a reverse drive output gear 28a mounted on the main drive shaft 10 to be rotatable relative thereto, a reverse drive transmission shaft 28b disposed below and parallel to the main drive shaft 10 and rotatably supported between the partition 22 and partition 25, a reverse gear 28c mounted on the reverse drive transmission shaft 28b to be rotatable therewith and meshed with the reverse drive output gear 28a for changing the direction of rotation, and a reverse drive transmission gear 28d mounted on the reverse drive transmission shaft 28b to be rotatable therewith, and meshed with the second input gear 30b for transmitting reverse drive to the change speed device 11.

The input shaft 32 of the change speed device 11 is disposed at the right-hand side of and parallel to the main drive shaft 10 and PTO drive shaft 16. The input shaft 32 is supported in a halfway position thereof by the partition 25 through a bearing, and in a rearward position through a bearing by a front wall 33 of the transmission case 3 that closes a rear opening of the clutch housing 1. A front portion of the input shaft 32 projects forward from the partition 25. The first and second input gears 26b and 30b are mounted on the portion of the input shaft 32 projecting into the second chamber 21. The first input gear 26b is mounted adjacent the front end of the input shaft 32. The second input gear 30b is mounted on the input shaft 32 adjacent the front surface of the partition 25.

The high-speed forward drive clutch 27, low-speed forward drive clutch 31 and reverse drive clutch 29 are in the form of hydraulic clutches operable by supplying pressure oil to these clutches 27, 31 and 29. In this embodiment, these clutches are wet type multi-disk clutches, and are arranged in series in the axial direction on the main drive shaft 10.

In this embodiment, the high-speed forward drive clutch 27, reverse drive clutch 29 and low-speed forward drive clutch 31 are arranged in the stated order from front to rear. The high-speed forward drive output gear 26a is disposed forwardly of the high-speed forward drive clutch 27. The reverse drive output gear 28a is disposed forwardly of the reverse drive clutch 29. The low-speed forward drive output gear 30a is disposed rearwardly of the low-speed forward drive clutch 31. The reverse gear 28c is disposed below the reverse drive output gear 28a. The reverse drive transmission gear 28d is disposed below the low-speed forward drive output gear 30a.

Each of the high-speed forward drive clutch 27, low-speed forward drive clutch 31 and reverse drive clutch 29 includes a clutch body 34 coaxially fixed to the main drive shaft 10 to be rotatable therewith, a piston 35 disposed in the clutch body 34, an inner cylinder 36 coaxially mounted on the main drive shaft 10 to be rotatable relative thereto, a pressure plate 37 rotatable with the clutch body 34, and drive plates 38 and clutch disks 39 arranged alternately in the axial direction between the pressure plate 37 and piston 35.

The drive plates 38 and clutch body 34 are rotatable together, while the clutch disks 39 and inner cylinder 36 are rotatable together. The inner cylinder 36 of the high-speed forward drive clutch 27 is rotatable with the high-speed forward drive output gear 26a. The inner cylinder 36 of the low-speed forward drive clutch 31 is rotatable with the low-speed forward drive output gear 30a. The inner cylinder 36 of the reverse drive clutch 29 is rotatable with the reverse drive output gear 28a.

In this embodiment, the reverse drive clutch 29 and low-speed forward drive clutch 31 share the same integrated clutch body 34.

In the clutches 27, 29 and 31 having the above construction, the piston 35 is moved toward the pressure plate 37 by pressure oil supplied to the back of the piston 35. Then, the piston 35 presses and moves the drive plates 38 and clutch disks 39 into pressure contact with the pressure plate 37. In this way, the clutches 27, 29 and 31 are engaged, whereby the clutch body 34, drive plates 38, pressure plate 37, clutch disks 39 and inner cylinder 36 rotate with the main drive shaft 10.

The piston 35 is returned to the original position by a return spring 40 when the pressure oil is drained from the back of the piston 35, then, the drive plates 38 and clutch disks 39 move apart from each other. In this way, the clutches 27, 29 and 31 are disengaged.

When the high-speed forward drive clutch 27 is engaged, high-speed forward drive is transmitted to the input shaft 32 through the high-speed forward drive gear train 26. When the low-speed forward drive clutch 31 is engaged, low-speed forward drive is transmitted to the input shaft 32 through the low-speed forward drive gear train 30. When the reverse drive clutch 29 is engaged, reverse drive power is transmitted to the input shaft 32 through the reverse drive gear mechanism 28.

The main drive shaft 10 has, formed therein, a first oil passage 41a for supplying pressure oil to the back of the piston 35 of the high-speed forward drive clutch 27, a second oil passage 41b for supplying pressure oil to the back of the piston 35 of the backward motion clutch 29, and a third oil passage 41c for supplying pressure oil to the back of the piston 35 of the low-speed forward drive clutch 31. These oil passages extend axially of the main drive shaft 10 and parallel to one another. The main drive shaft 10 has a first to a third circumferential grooves 45a, 45b and 45c formed in outer peripheral surfaces of a portion thereof extending through the partition 22. The first oil passage 41a noted above communicates with the first circumferential groove 45a. The second oil passage 41b communicates with the second circumferential groove 45b. The third oil passage 41c communicates with the third circumferential groove 45c. One of the high-speed forward drive clutch 27, reverse drive clutch 29 and low-speed forward drive clutch 31 is operable by selectively supplying pressure oil to the first to third circumferential grooves 45a, 45b and 45c from a shuttle valve 42 and a high-speed and low-speed change valve 44 described hereinafter.

With the high-speed forward drive clutch 27, low-speed forward drive clutch 31 and reverse drive clutch 29 consisting of hydraulic clutches and arranged in series axially of the main drive shaft 10, the above reverse and forward drive switching device 12 can simplify the construction in forming oil passages 41a-c for supplying pressure oil to these clutches 27, 31 and 29.

A switching between driving the tractor forward and driving it backward is carried out, for example, by operating a control device such as a shuttle lever provided adjacent a steering wheel. The shuttle valve 42 is switchable by this shuttle lever.

Figure 4:
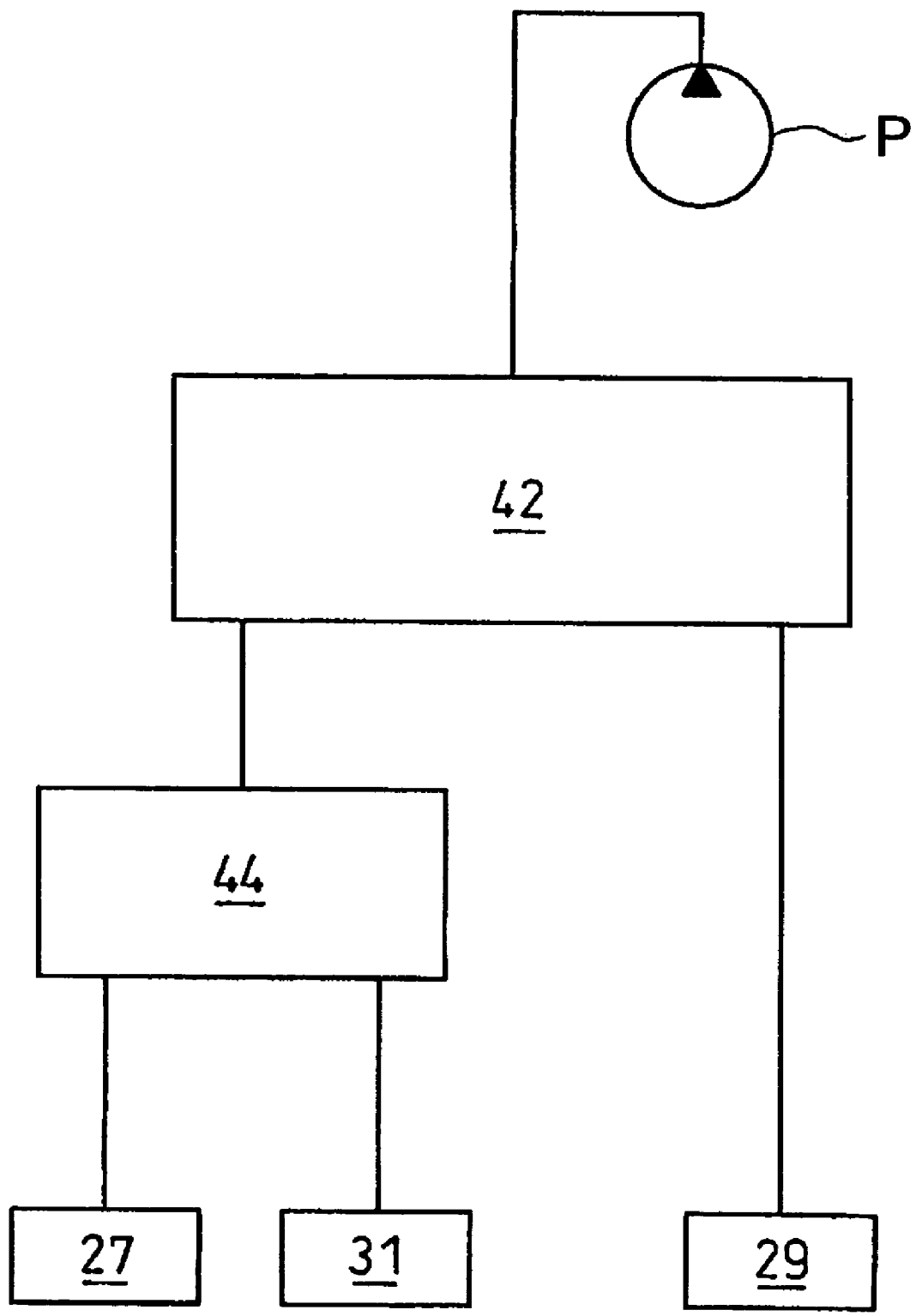
FIG. 4 is a block diagram of a control system of the reverse and forward drive switching device.

As shown in FIG. 4, pressure oil from a hydraulic pump P is supplied to the shuttle valve 42. This shuttle valve 42 is operable to switch an oil line (flow) for supplying the pressure oil to the forward drive clutches 27 and 31 or the reverse drive clutch 29.

When the shuttle valve 42 is operated to neutral, the pressure oil is supplied to neither the forward drive clutches 27 and 31 nor the reverse drive clutch 29.

A high speed and low speed selector valve 44 is mounted on an oil line between the shuttle valve 42 and the forward drive clutches 27 and 31. This selector valve 44 is operable to switch an oil line (flow) for supplying the pressure oil received through the shuttle valve 42 to the high-speed forward drive clutch 27 or low-speed forward drive clutch 31.

The switching operation of the high speed and low speed selector valve 44 is carried out by a control device such as a high speed and low speed selector lever disposed adjacent a driver's seat, for example.

As noted above, the high speed and low speed selector valve 44 is mounted on the oil line between the shuttle valve 42 and the forward drive clutches 27 and 31 for supplying pressure oil to the high-speed forward drive clutch 27 or low-speed forward drive clutch 31. When the shuttle valve 42 is operated, with the high speed and low speed selector valve 44 switched to supply the pressure oil to the high-speed forward drive clutch 27 or low-speed forward drive clutch 31, the shuttle valve 42 can act as a main clutch. The shuttle valve 42 has also a modulation function or inching function for controlling the high-speed forward drive clutch 27, low-speed forward drive clutch 31 and reverse drive clutch 29.

The shuttle valve 42 and high speed and low speed selector valve 44 are attached to the transmission case 3. From these valves 42 and 44, pressure oil is supplied to a selected one of the first to third circumferential grooves 45a-c of formed on the main drive shaft through hydraulic oil lines such as oil passages and pipes formed in the walls and partition 22 of the transmission case 3.

The hydraulic pump P, which supplies pressure oil to the shuttle valve 42 and high speed and low speed selector valve 44, and to a power steering control valve, an auxiliary control valve, hydraulic equipment for a hydraulic working implement lifting device and so on, is in the form of a double pump having two gear pumps arranged close to each other in juxtaposition, and is mounted in an upper front position on a right-hand side surface of the transmission case 3.

Next, a reverse and forward drive switching device 112 disposed in the second chamber 21 and a change speed device 111 disposed in the third chamber 24 in a second embodiment will be described.

The reverse and forward drive switching device 112 in the second embodiment does not include a mechanism for changing speed of forward drive into two, high and low stages.

The reverse and forward drive switching device 112 includes a forward drive clutch 126 mounted on the main drive shaft 10, a forward drive output gear 127 mounted on the main drive shaft 10 rearwardly of the forward drive clutch 126 to be rotatable relative to the main drive shaft 10, a reverse drive clutch 123, a reverse drive output gear 128 mounted on the main drive shaft 10 forwardly of the reverse drive clutch 123 to be rotatable relative to the main drive shaft 10, a reverse drive transmission shaft 129 disposed below and parallel to the main drive shaft 10 and rotatably supported between the partition 22 and partition 25, a reverse drive first transmission gear 130 mounted on a front portion of the reverse drive transmission shaft 129 to be rotatable therewith, and a reverse drive second drive gear 131 mounted on a rear portion of the reverse drive transmission shaft 129 to be rotatable therewith.

The forward drive output gear 127 and reverse drive second transmission gear 131 are meshed with an input gear 132 that inputs drive to the change speed device 111. The reverse drive first transmission gear 130 is meshed with the reverse drive output gear 128.

The forward drive clutch 126 and reverse drive clutch 123 are in the form of wet type multi-disk hydraulic clutches having a common clutch body 133 coaxially fixed to the main drive shaft 10. A piston 138 for forward drive or a piston 139 for reverse drive is operable by hydraulic pressure, to move a drive plate rotatable with the clutch body 133, into pressure contact with clutch disks rotatable with the forward drive output gear 127 or reverse drive output gear 128. As a result, the drive from the main drive shaft 10 is transmitted to the forward drive output gear 127 or reverse drive output gear 128. Thus, forward drive is transmitted from the forward drive output gear 127 to the input gear 132, or reverse drive power is transmitted from the reverse drive output gear 128 to the input gear 132 by way of the reverse drive first transmission gear 130, reverse drive transmission shaft 129 and reverse drive second transmission gear 131.

When the piston 138 for forward drive or the piston 139 for reverse drive is not operated, the power from the main drive shaft 10 is not transmitted to the forward drive output gear 127 or reverse drive output gear 128.

Next, the change speed device 111 disposed in the third chamber 24 will be described. The change speed device 111 includes a main change speed device 141 for changing the power received from the reverse and forward drive switching device 112 into four, a first to a fourth, speeds, an auxiliary change speed device 142 for further changing the power received from the main change speed device 141 into two, high and low, speeds, a creep change speed device 143 for further changing the power received from the main change speed device 141 into a super-low speed slower than the low speed provided by the auxiliary change speed device 142, an input shaft 144 for receiving power from the reverse and forward drive switching device 112, a counter shaft 145 for receiving power from the input shaft 144 through the main change speed device 141, and an output shaft 146 for outputting power at varied speeds provided by the change speed device 111.

The input shaft 144 is disposed rearwardly of the reverse and forward drive switching device 112, and at the right-hand side of and parallel to the PTO drive shaft 16. The input shaft 144 is supported in a forward position thereof by the partition 25 through a bearing, and in a rearward position through a bearing by a front wall 147 of the transmission case 3 that closes a rear opening of the clutch housing 1. A front portion of the input shaft 144 projects forward from the partition 25. The input gear 132 is mounted on the portion of the input shaft 144 projecting into the second chamber 21 to be rotatable with the input shaft 144.

Thus, the front portion of the input shaft 144 projects toward the reverse and forward drive switching device 112, with the input gear 132 mounted on the projecting portion. The input shaft 144 is disposed laterally with respect to a position between the main drive shaft 10 and reverse drive transmission shaft 129. This arrangement allows the input gear 132 to be meshed simultaneously with the forward drive output gear 127 and reverse drive second transmission gear 131.

The counter shaft 145 is a tubular shaft relatively rotatably mounted on the PTO drive shaft 16.

The output shaft 146 has an axis extending fore and aft, and is disposed rearwardly of the reverse drive transmission shaft 129, and directly under and parallel to the counter shaft 145. The output shaft 146 is rotatably supported by the partition 25 and the front wall 147 of the transmission case 3 through bearings, and extends into the transmission case 3. The rear end of the output shaft 146 is connected through a coupling to a differential drive shaft 48 that transmits power to the rear wheel differential 13.

Thus, the input shaft 144, counter shaft 145 and output shaft 146 are arranged parallel to one another, and at vertices of a triangle.

Figure 5:
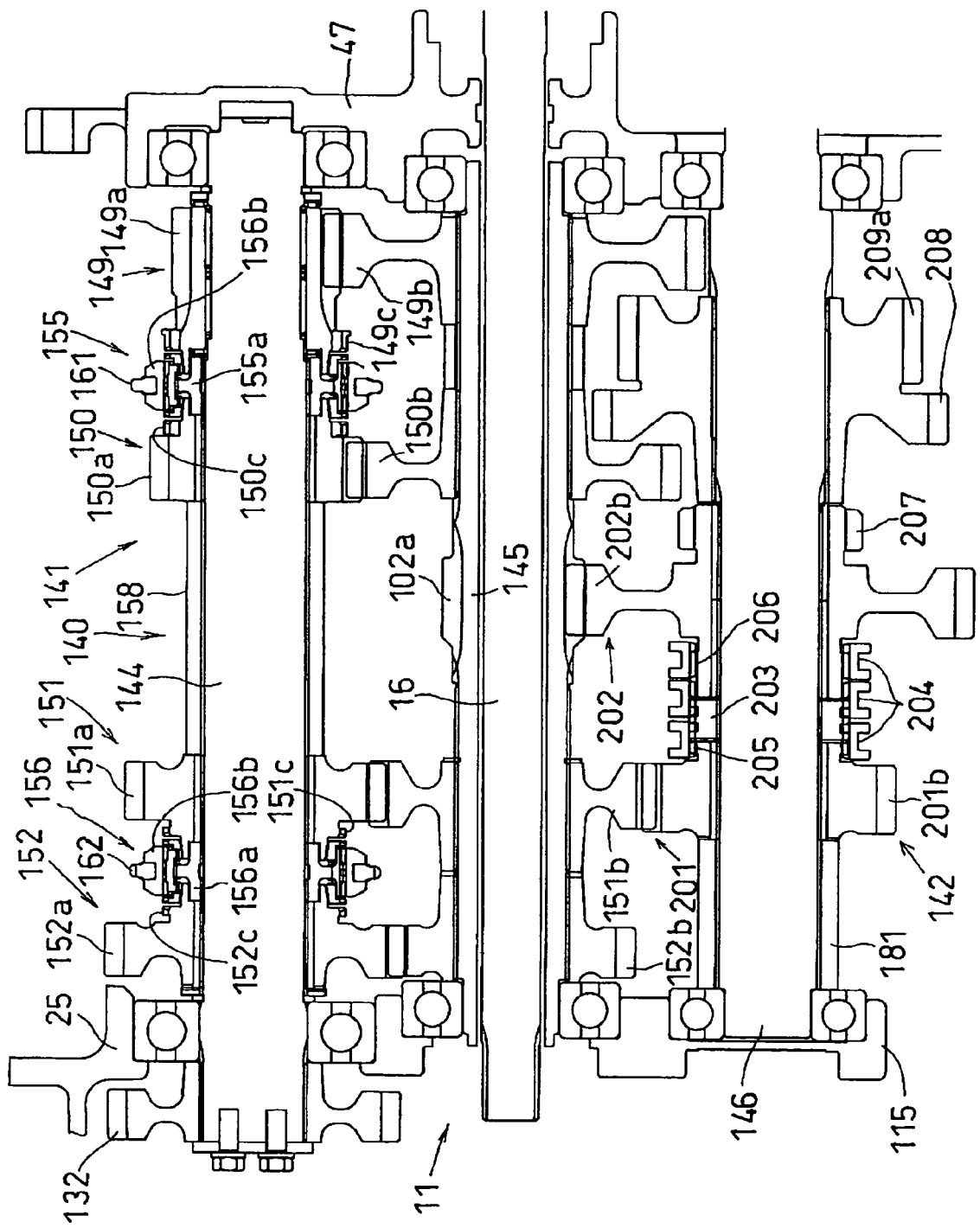
FIG. 5 is a sectional side view of a main change speed device for providing four speeds.

As shown in FIG. 5, the main change speed device 141 is in the form of a synchromesh type change speed mechanism, and includes a first to a fourth speed gear trains 149-152 for transmitting power from the input shaft 144 to the counter shaft 145, and a first and a second main speed switching clutches 155 and 156 for switching a power transmitting path to transmit power through one of the first to fourth speed gear trains 149-152.

The first to fourth speed gear trains 149-152 are arranged in the order, from front to rear, of the fourth speed gear train 152, third speed gear train 151, second speed gear train 150 and first speed gear train 149. A space 140 is provided between the third speed gear train 151 and second speed gear trains 150 for allowing two gear trains to be added to the main change speed device 141. In this embodiment, a specification change of the main change speed device 141 can be made from four-speed specification to six-speed specification.

The first to fourth speed gear trains 149-152 have drive gears 149*a*-152*a* mounted on the input shaft 144 to be rotatable relative thereto, and driven gears 149*b*-154*b* mounted on the counter shaft 145 to be rotatable therewith.

The first main speed switching clutch 155 is disposed between the drive gears 149*a* and 150*a* of the first speed gear train 149 and second speed gear train 150 for switching between a first speed and a second speed. The second main speed switching clutch 156 is disposed between the drive gears 151*a* and 152*a* of the third speed gear train 151 and fourth speed gear train 152 for switching between a third speed and a fourth speed.

The first and second main speed switching clutches 155 and 156 are in the form of a synchronous clutches having synchromesh mechanisms for switching the gear trains 149-152 (changing gear) by synchronizing the numbers of rotations of the driving side (input shaft 144) and the driven side (drive gears of the gear trains of the main change speed device 141). Each of the main speed switching clutches 155 and 156 includes a coupling 155a or 156a mounted on the input shaft 144 to be rotatable therewith, and a main change speed shifter (clutch gear) 155b or 156b mounted on the coupling 155a or 156a to be rotatable therewith and axially movable (in the fore and aft direction).

The main change speed shifter 155b of the first main speed switching clutch 155 is called the first main change speed shifter 155b. The main change speed shifter 156b of the second main speed switching clutch 156 is called the second main change speed shifter 156b.

The input shaft 144 has splines formed between the drive gear 151a of the third speed gear train 151 and the drive gear 150a of the second speed gear train 150 for fitting with a coupling and the like of a main speed switching clutch to be added. A cylindrical spacer 158 is mounted between the drive gears 151a and 150a of the third speed gear train 151 and second speed gear train 150.

The drive gears 149a-152a of the first to fourth speed gear trains 149-152 have engaging portions 149c-152c for meshing with the first and second main change speed shifters 155b and 156b, respectively. When the first and second main change speed shifters 155b and 156b are out of mesh with the engaging portions 149c-152c, a non-power transmission state or neutral position is provided in which power is not transmitted from the input shaft 144 to the counter shaft 145 through the first to fourth speed gear trains 149-152. When one of the first and second main change speed shifters 155b and 156b is slid axially (backward or forward) from the neutral position to move the coupling 155a or 156a into mesh with one of the engaging portions 149c-152c of the drive gears 149a-152a of the first to fourth speed gear trains 149-152, power is transmitted from the input shaft 144 to the counter shaft 145 through the coupling 155a or 156a, main change speed shifter 155b or 156b, one of the engaging portions 149c-152c, one of the drive gear 149a-152a and one of the driven gears 149b-152b. Thus, the power inputted to the input shaft 144 is transmitted to the counter shaft 145 at a selected one of the first to fourth speeds provided by the main change speed device 141.

Figure 6:
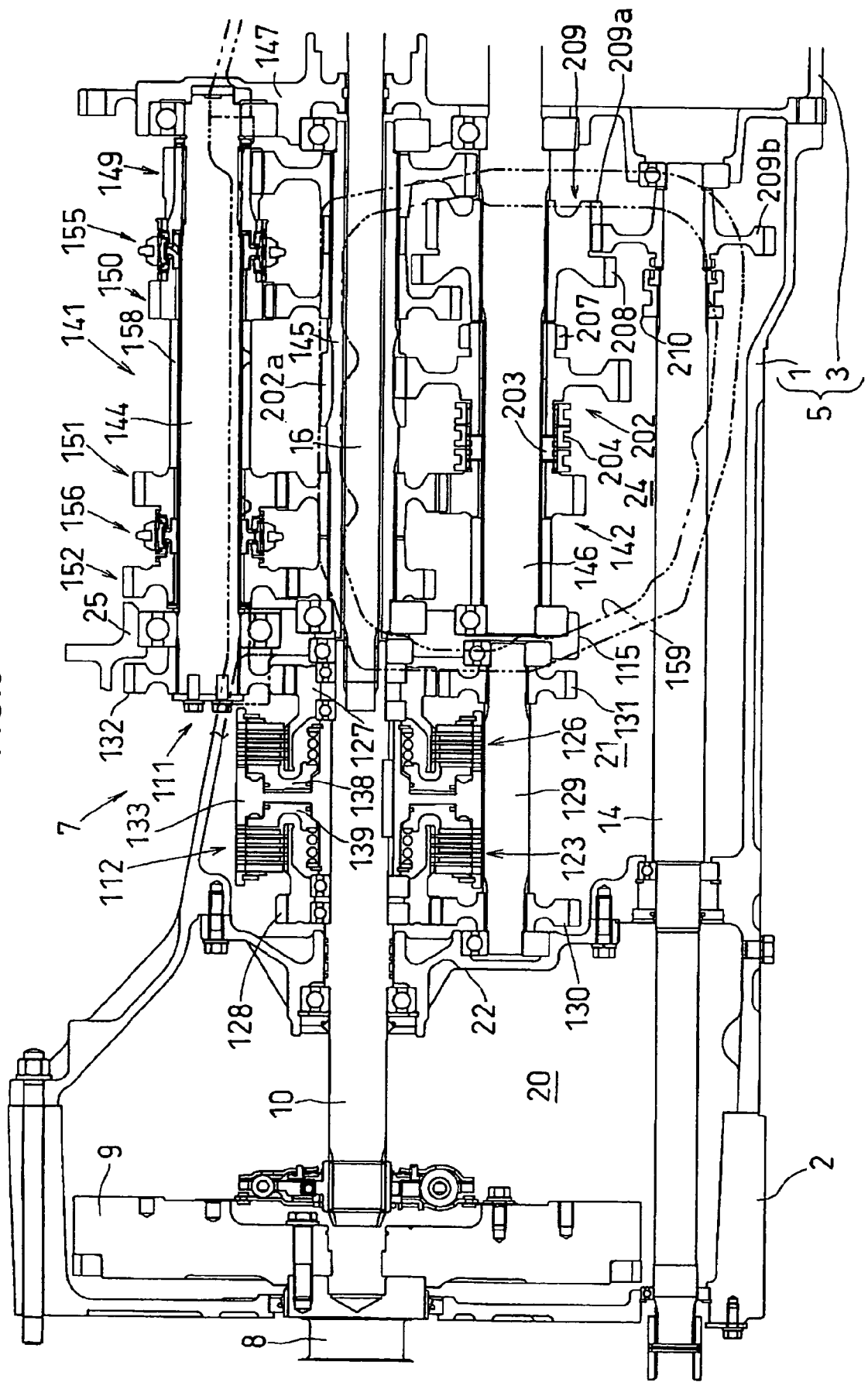
FIG. 6 is a sectional side view of the forward portion of the power transmission system.
Figure 7:
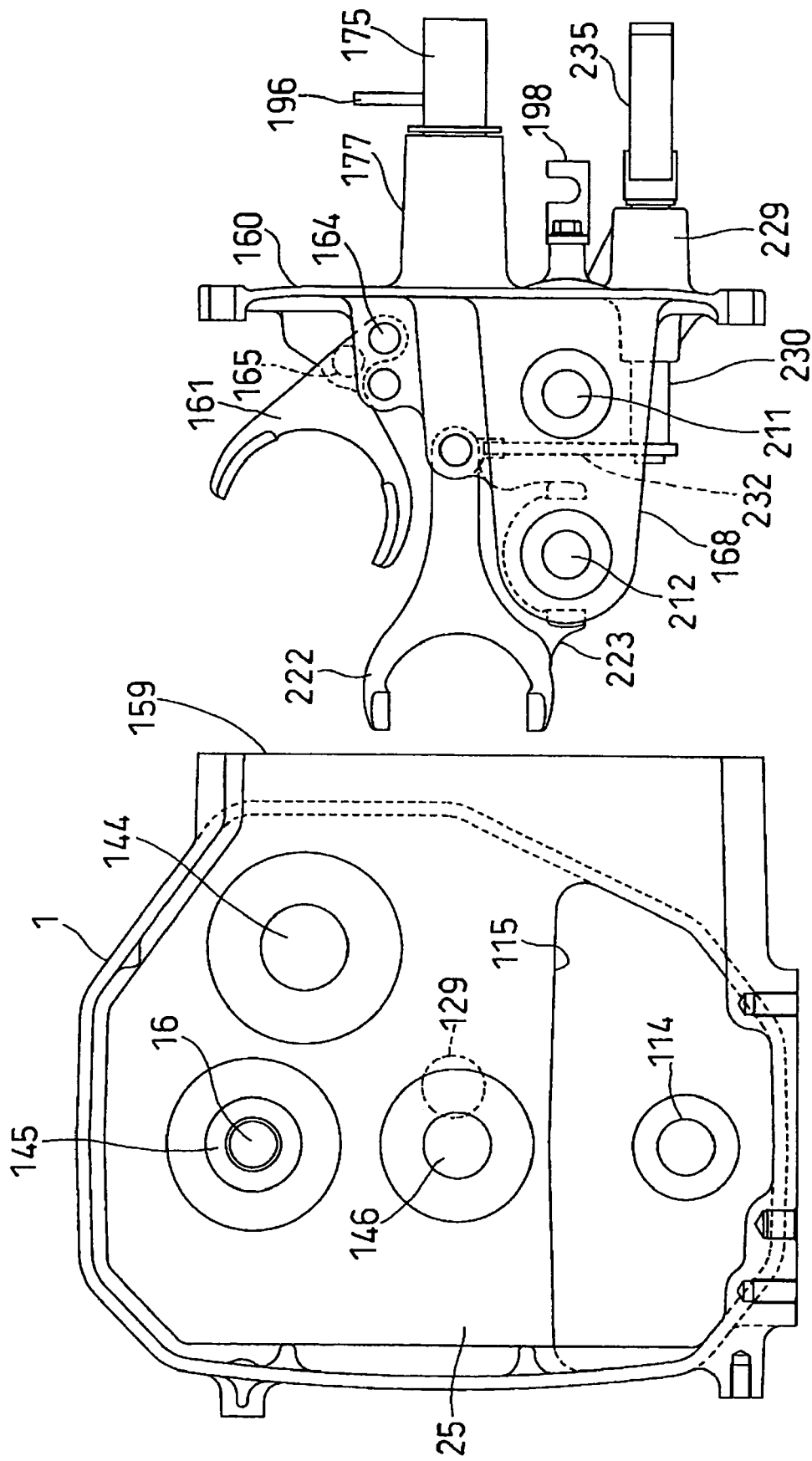
Figure 8:
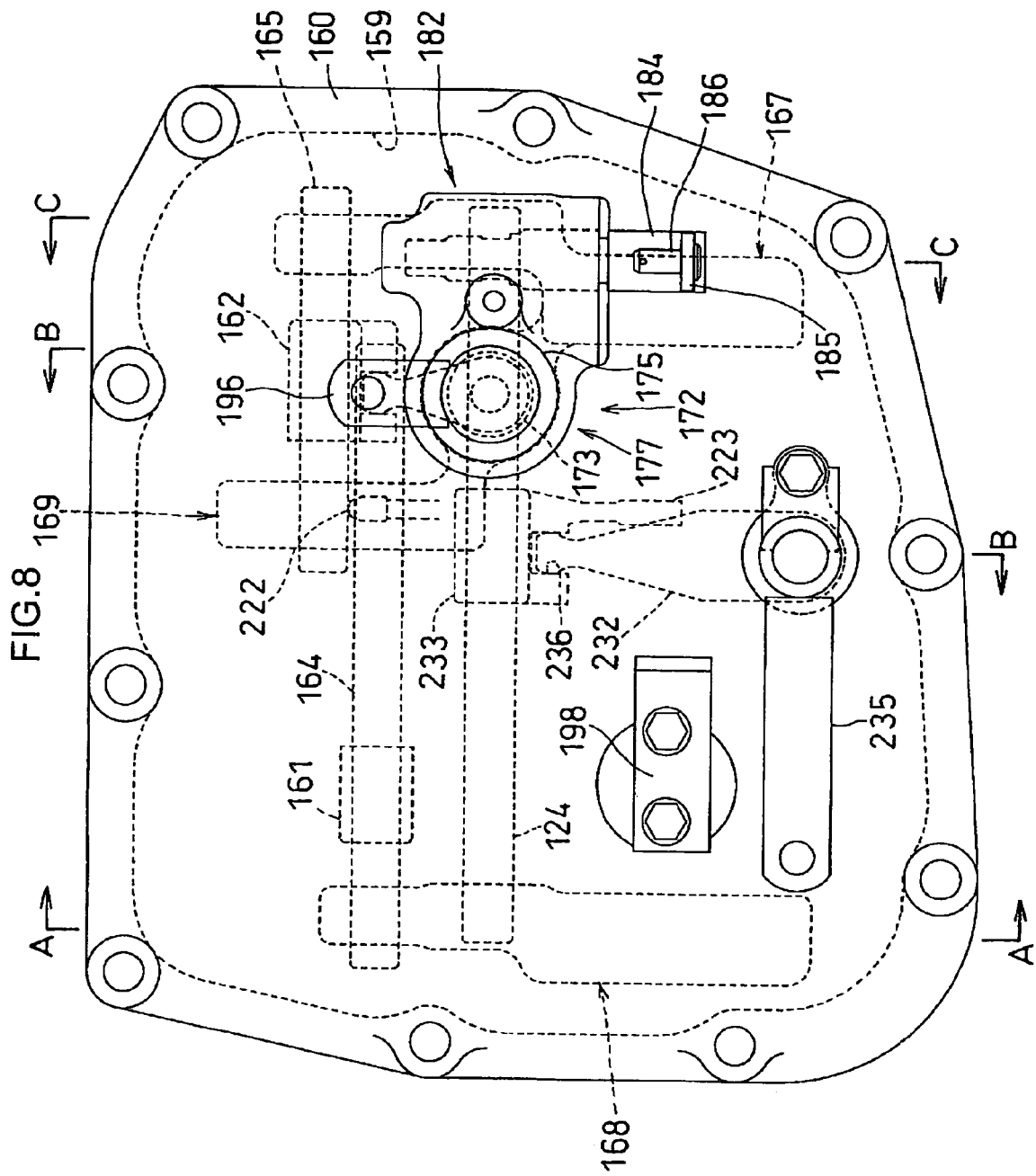
FIG. 8 is a side view of the cover.
Figure 9:
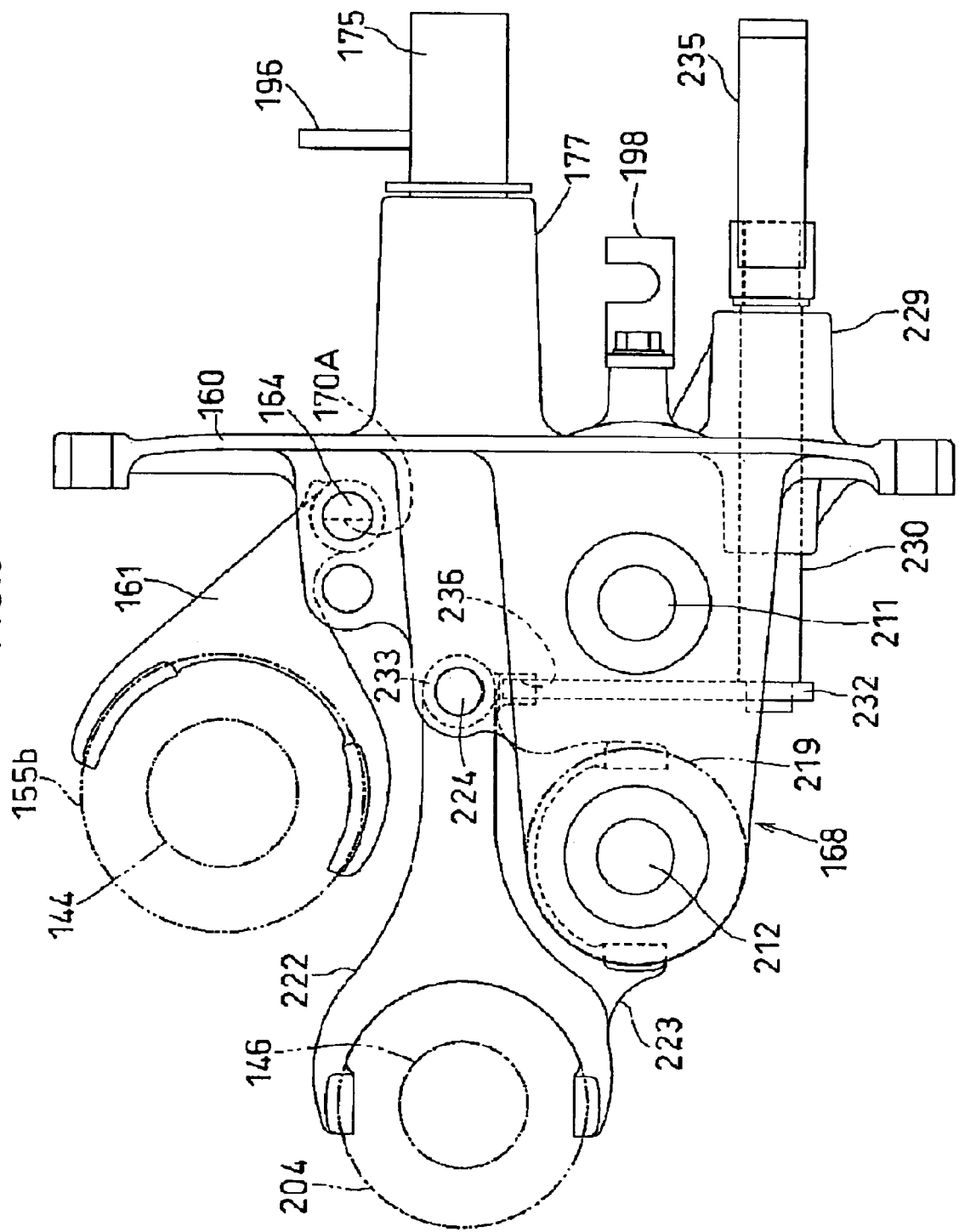
FIG. 9 is a section taken on line A-A of FIG. 8.
Figure 10:
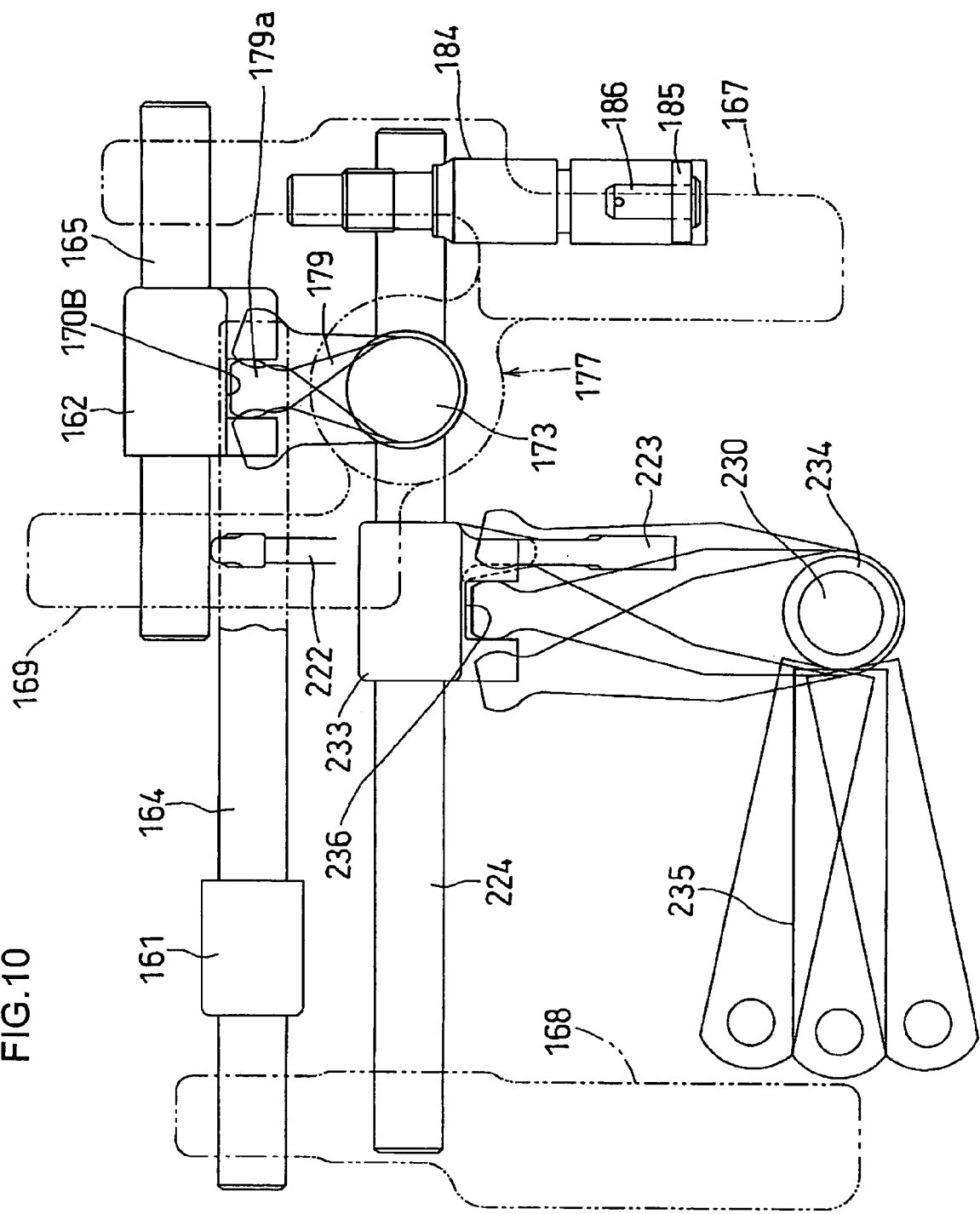
FIG. 10 is a side view of a shift mechanism of the main change speed device, an auxiliary change speed device and a creep change speed device.
Figure 11:
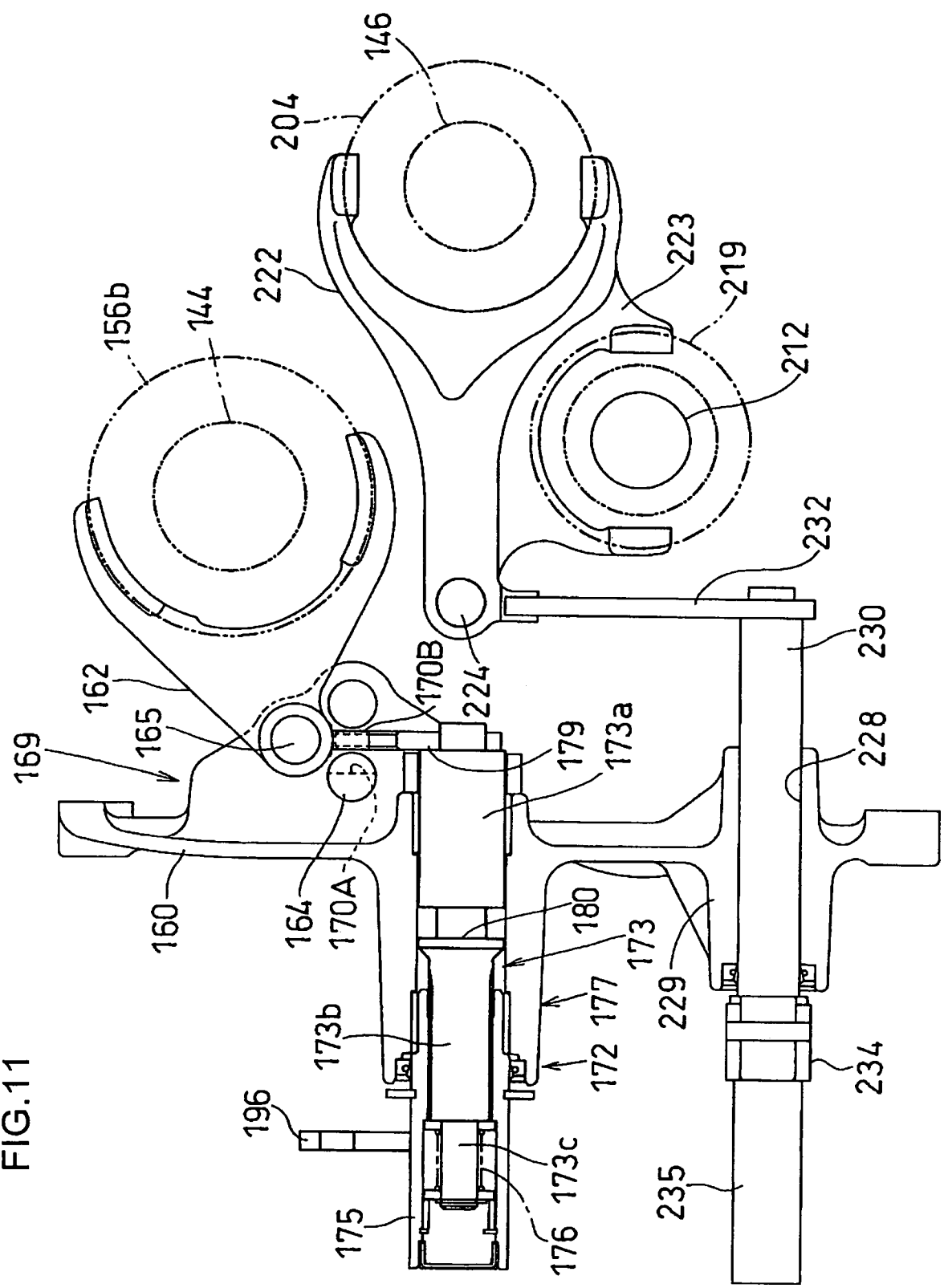
FIG. 11 is a section taken on line B-B of FIG. 8.
Figure 12:
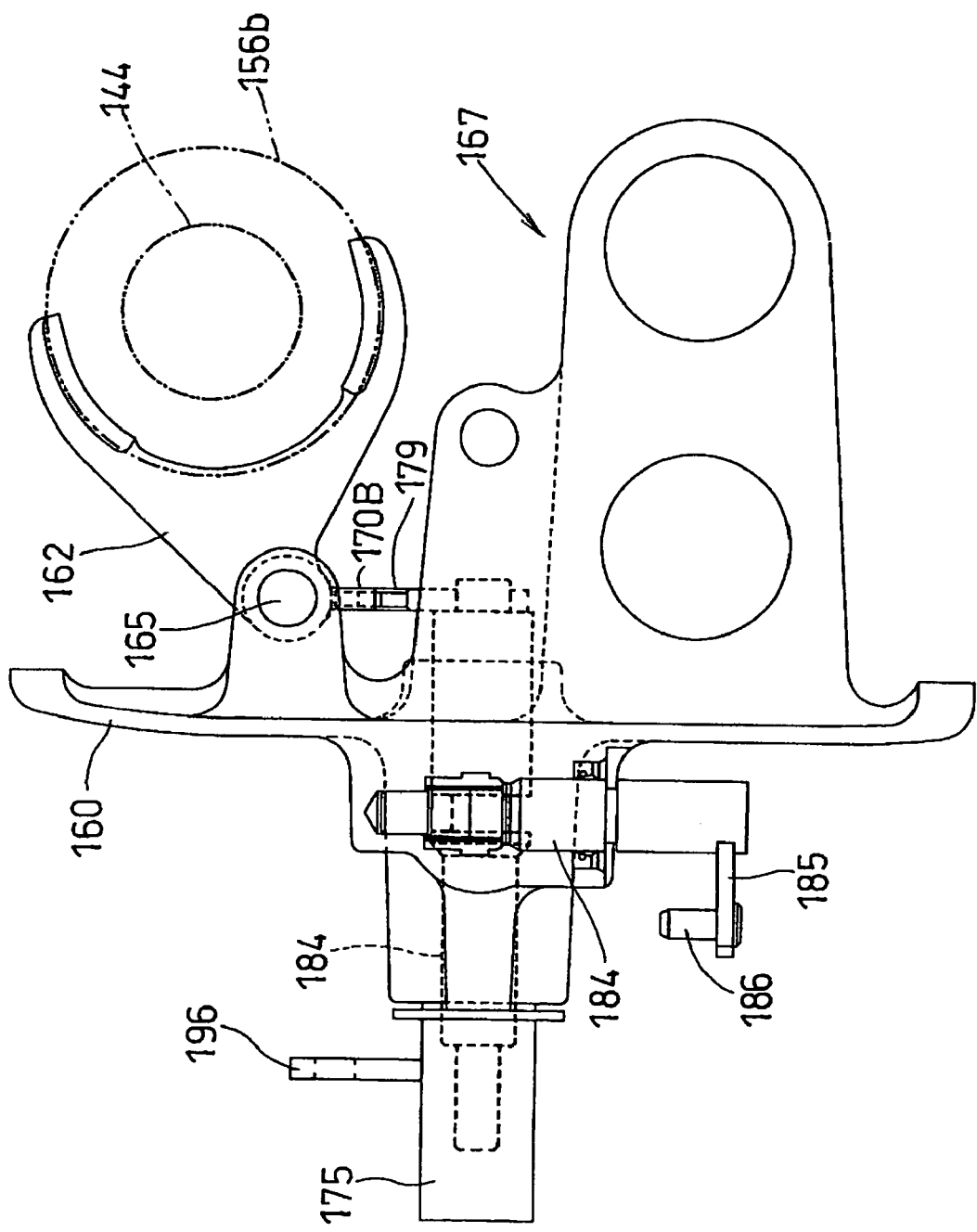
FIG. 12 is a section taken on line C-C of FIG. 9.
Figure 13:
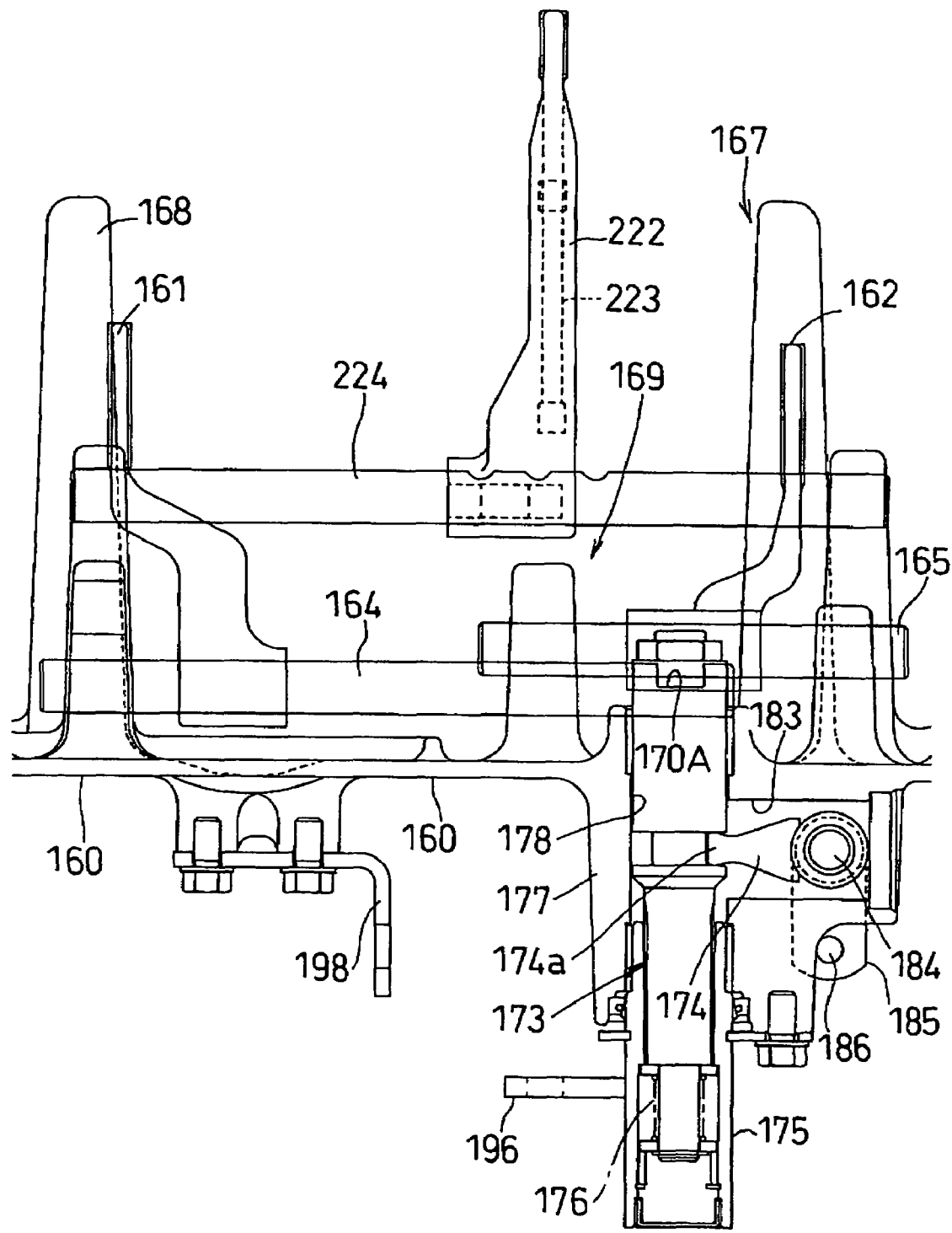
FIG. 13 is a plan view of the shift mechanism of the main change speed device, auxiliary change speed device and creep change speed device.

As shown in FIGS. 6 and 7, the clutch housing 1 has an opening 159 formed in the right-hand side wall thereof. The opening 159 is closed with a cover 160 detachably attached to the clutch housing 1.

As shown in FIGS. 8 through 14, the cover 160 has a first and a second main change speed shift forks 161 and 162 for engaging the first and second main change speed shifters 155b and 156b and axially moving the shifters 155b and 156b to switch power transmitting paths. The first main change speed shift fork 161 engages the first main change speed shifter 155b. The second main change speed shift fork 162 engages the second main change speed shifter 156b.

Further, the cover 160 includes two shift rods 164 and 165 corresponding to the first and second main change speed shift forks 161 and 162 for supporting the first and second main change speed shift forks 161 and 162.

The cover 160 also includes, attached to upper inner positions thereof, a pair of front and rear support walls 167 and 168, and an intermediate support wall 169 disposed between upper portions of the support walls 167 and 168.

The shift rods 164 and 165 have axes extending in the fore and aft direction. The first shift rod 164 supporting the first main change speed shift fork 161 extends between and is supported by upper portions of the rear support wall 168 and intermediate support wall 169 to be movable fore and aft. The second shift rod 165 supporting the second main change speed shift fork 162 extends between and is supported by the front support wall 167 and intermediate support wall 169 to be movable fore and aft.

The first main change speed shift fork 161 is fixedly attached at a proximal end thereof to the first shift rod 164. The second main change speed shift fork 162 is fixedly attached at a proximal end thereof to the second shift rod 165. The first and second main change speed shift forks 161 and 162 are supported by the cover 160 through the first and second shift rods 164 and 165 to be movable fore and aft.

The first shift rod 164 and the proximal end of the second main change speed shift fork 162 have engaging portions 170A and 170B in the form of grooves. The engaging portions 170A and 170B are juxtaposed in the transverse direction (the engaging portion of the first shift rod 164 being called the first engaging portion 170A, and the engaging portion of the proximal end of the second main change speed shift fork 162 the second engaging portion 170B).

The cover 160 further includes a control mechanism 172 interlocked to a main shift lever rockably supported by the tractor body for controlling the first and second main change speed shift fork 161, 162.

The control mechanism 172 includes a control shaft 173 for selectively controlling the first and second main change speed shift fork 161 and 162, a selector member 174 for engaging and axially moving the control shaft 173 for selecting one of the first and second main change speed shift forks 161 and 162, a rotatable member 175 mounted on the control shaft 173 to be axially movable relative thereto and rotatable therewith, for moving the main change speed shift forks 161 and 162 by rotating the control shaft 173, and a return spring 176 for returning the control shaft 173 to a standard position.

On the other hand, the cover 160 includes a support 177 formed integrally therewith and projecting laterally outward. The support 177 has a support bore 178 extending therethrough and having an axis extending in the transverse direction. The control shaft 173 is mounted in this support bore 178.

The control shaft 173 has a large diameter portion 173a located transversely inward, a medium diameter portion 173b located in a transversely halfway position and smaller in diameter than the large diameter portion 173a, and a small diameter portion 173c located transversely outward and smaller in diameter than the medium diameter portion 173b.

The large diameter portion 173a is supported in the support bore 178 to be axially movable (right and left). An arm 179 extends radially outward and upward from a transversely inward end position of the large diameter portion 173a. An engaging groove 180 is formed throughout the circumference of a transversely outward end of the large diameter portion 173a.

The arm 179 has a distal end (upper end or engageable end) 179a thereof engaging with the engaging portion 170B of the second main change speed shift fork 162 in the standard position of the control shaft 173. As the control shaft 173 is moved to a transversely outward position (first moving position) from the standard position, the distal end 179a of the arm 179 engages the engaging portion 170A of the first shift rod 164. Thus, one of the first and second main change speed shift forks 161 and 162 is selected by transversely moving the control shaft 173.

By rotating the control shaft 173 about its axis (about the transversely extending axis) in the standard position or first moving position, the arm 179 pivots fore and aft about the transverse axis. This moves the selected one of the main change speed shift forks 161 and 162 fore and aft.

The support 177 has, in a front position corresponding to the engaging groove 180, a storage portion 182 for storing the selector member 174.

The storage portion 182 has a storage chamber 183 formed by closing the front of a bore extending fore and aft through a storage portion forming member, and communicating with the support bore 178 of the support 177. A rotatable rod 184 extends vertically through the storage chamber 183 to be supported for rotation about a vertical axis.

The selector member 174 is stored in the storage chamber 183. The selector member 174 has a proximal end thereof fixed to the rotatable rod 184, and projects radially outward and rearward therefrom. The selector member 174 has a distal end 174a thereof inserted into the support bore 178 and engaged with the engaging groove 180. By rotating the rotatable rod 184, the selector member 174 is swung right and left to move the control shaft 173 right and left.

The rotatable rod 184 has a lower portion thereof projecting downward from the storage portion 182. A first lever member 185 is fixed to the downwardly projecting portion to project radially outward and transversely outward. The first lever member 185 has a wire connecting pin 186.

The rotatable member 175 is formed tubular, and has a transversely inward portion thereof inserted into a transversely outward portion of the support bore 178 to be rotatable about the transverse axis. The transversely inward portion of the rotatable member 175 is mounted on (splined to) the medium diameter portion 173b of the control shaft 173.

The rotatable member 175 is retained in place by a plate 187 fixed by bolts to an outer surface of the support 177, to be rotatable about the transverse axis.

The rotatable member 175 has a transversely outward portion thereof defining an accommodation bore 188 having a larger diameter than the inward spline portion. The rotatable member 175 defines a stepped bore, and the small diameter portion 173c of the control shaft 173 projects into the accommodation bore 188.

The small diameter portion 173c of the control shaft 173 has a pair of right and left ring-like spring bearings 189 and 190 mounted thereon and opposed to each other in the transverse direction to be movable relative thereto in the transverse direction (i.e. axially of the control shaft 173). A return spring 176 in the form of a compression coil spring is mounted between the spring bearings 189 and 190.

The spring bearing 189 located transversely outward (which is called an outward spring bearing) is retained in place on the small diameter portion 173c by a contact member (called an outward contact member) 191 in the form of a retaining ring fitted in a transversely outward end position on the small diameter portion 173c.

Fitted in a position transversely outward of the outward spring bearing 189 is a restricting member (called an outward restricting member) 192 in the form of a tube for restricting movement of the outward spring bearing 189. The outward restricting member 192 is retained in place against transversely outward movement away from the accommodation bore 188 by a retaining member 193.

The outward restricting member 192 has a larger inside diameter than the outward contact member 191 mounted on the small diameter portion 173c of the control shaft 173. The small diameter portion 173c and outward contact member 191 are transversely movable inside and relative to the outward restricting member 192.

Figure 14:
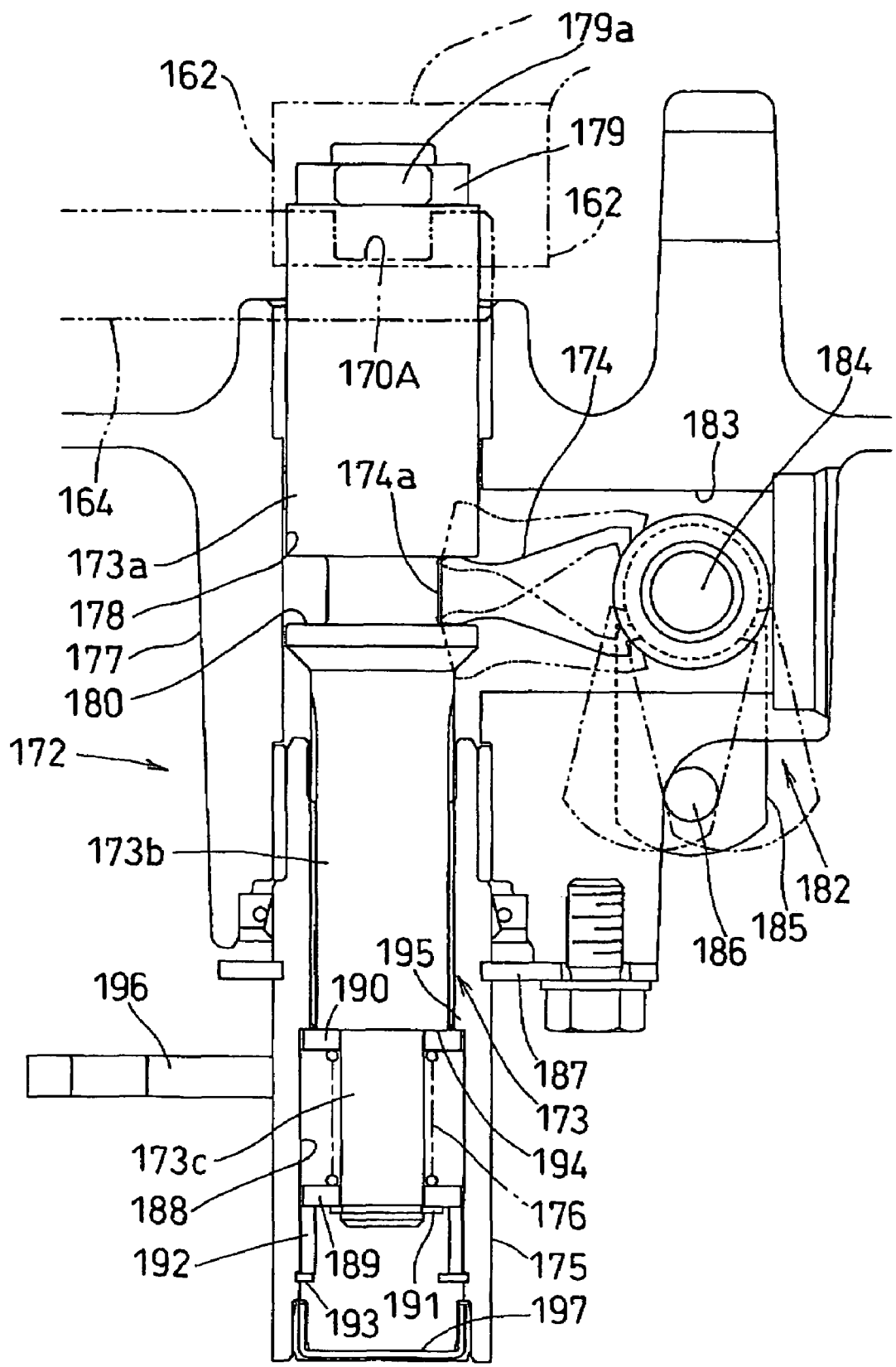
FIG. 14 is a sectional plan view of a control mechanism of the main change speed device.
Figure 15:
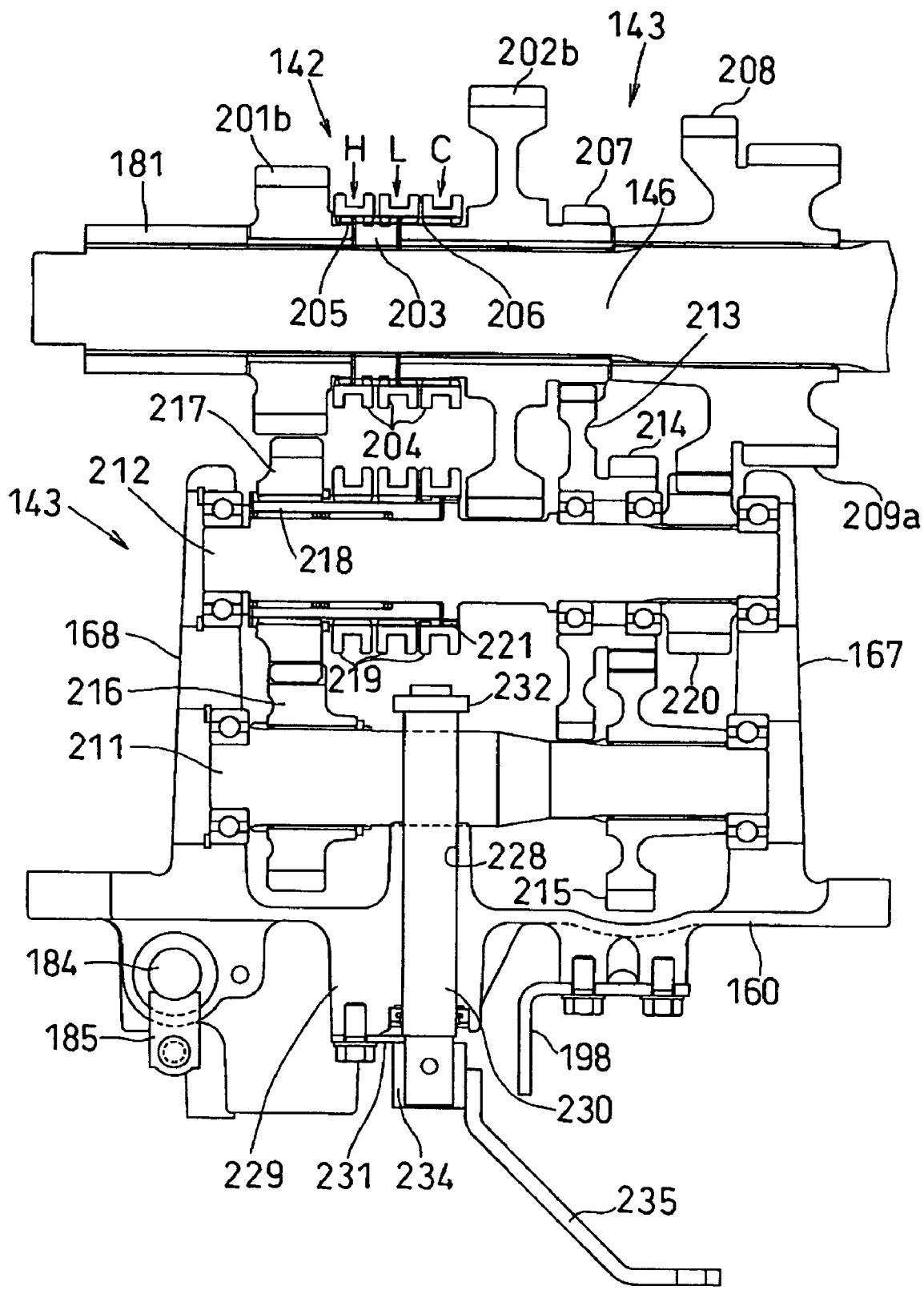
FIG. 15 is a sectional bottom view of the auxiliary change speed device and creep change speed device.
Figure 17:
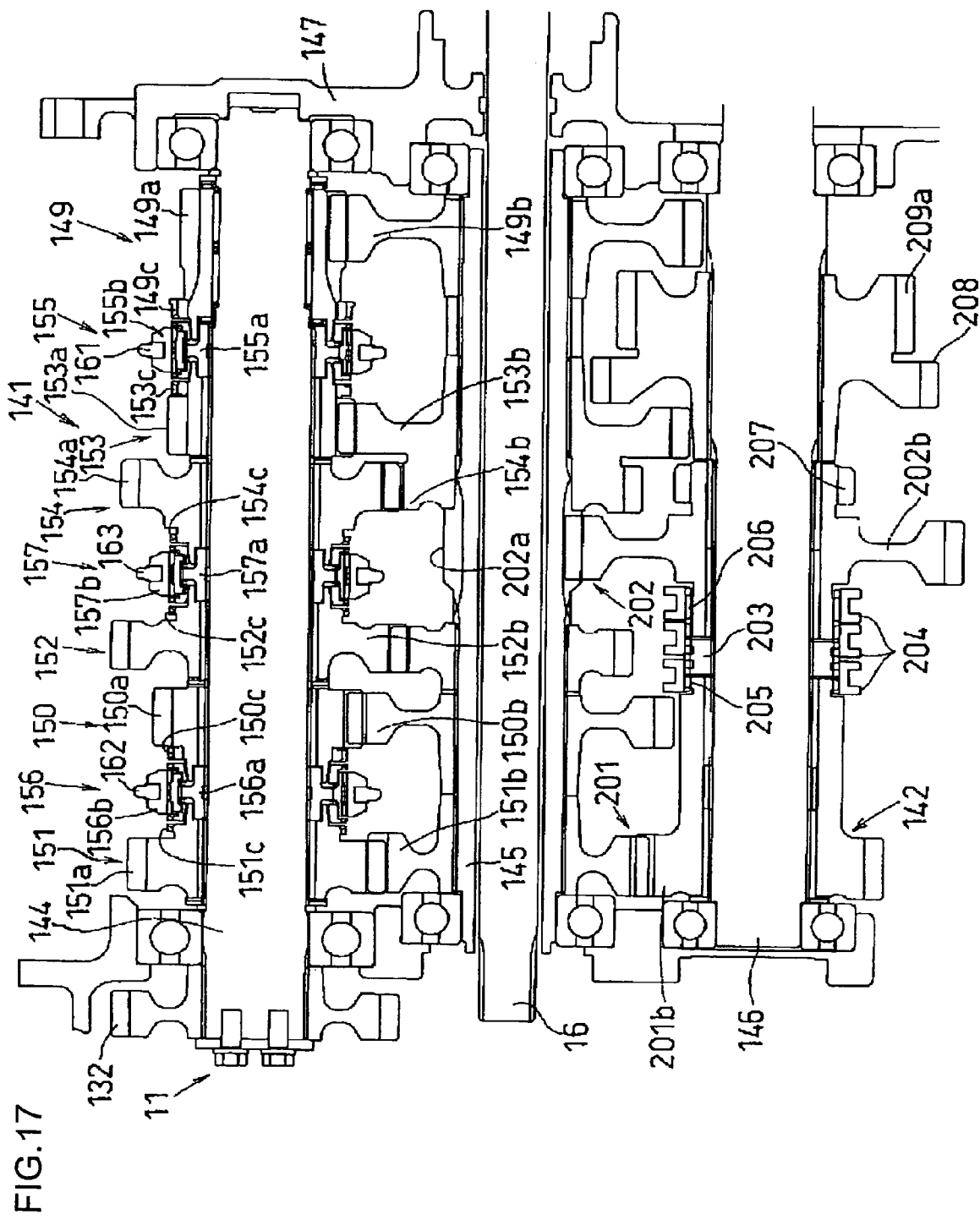
FIG. 17 is a sectional side view of a main change speed device for providing six speeds.
Figure 18:
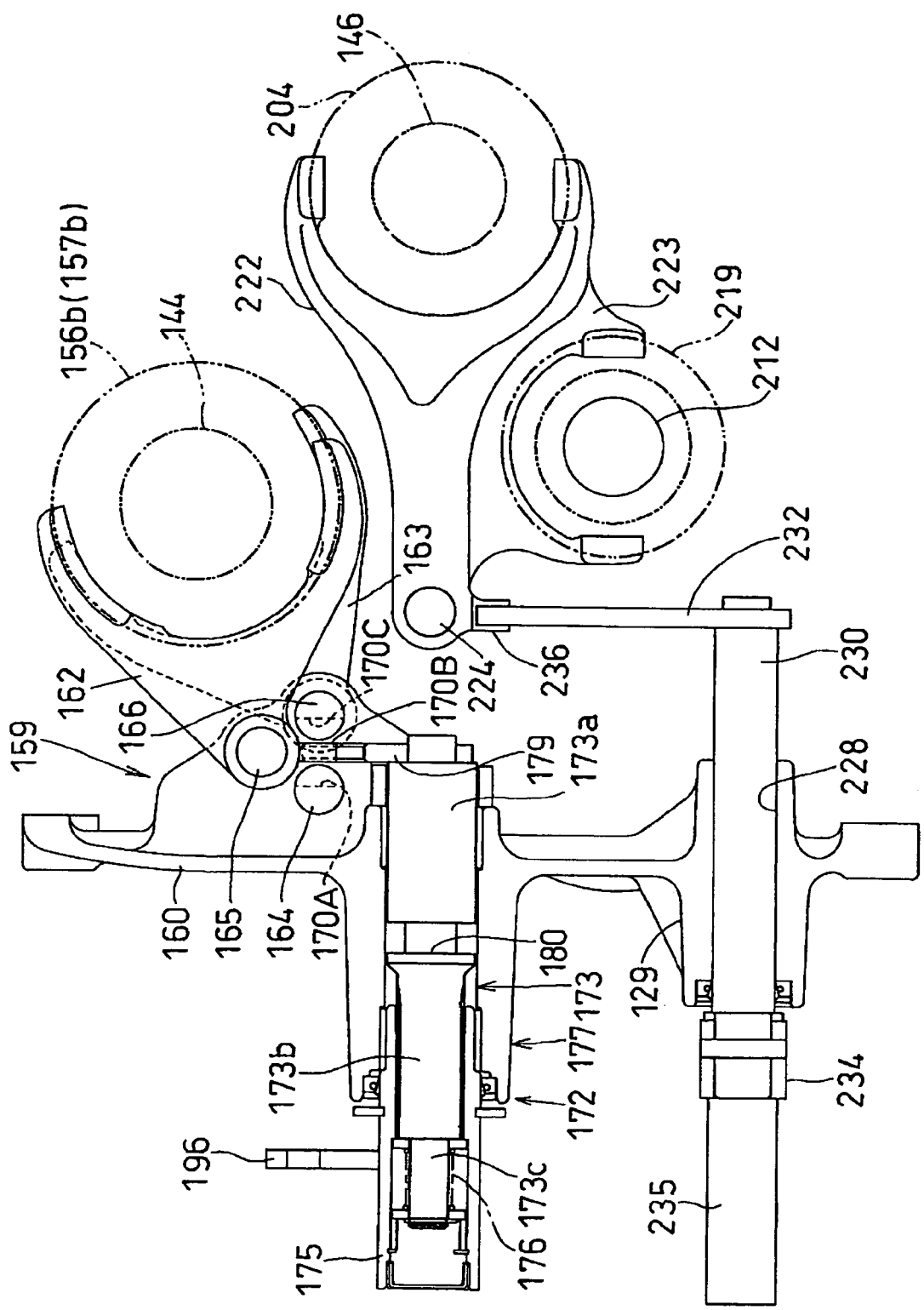
FIG. 18 is a view corresponding to FIG. 11 and showing the main change speed device for providing six speeds.
Figure 19:
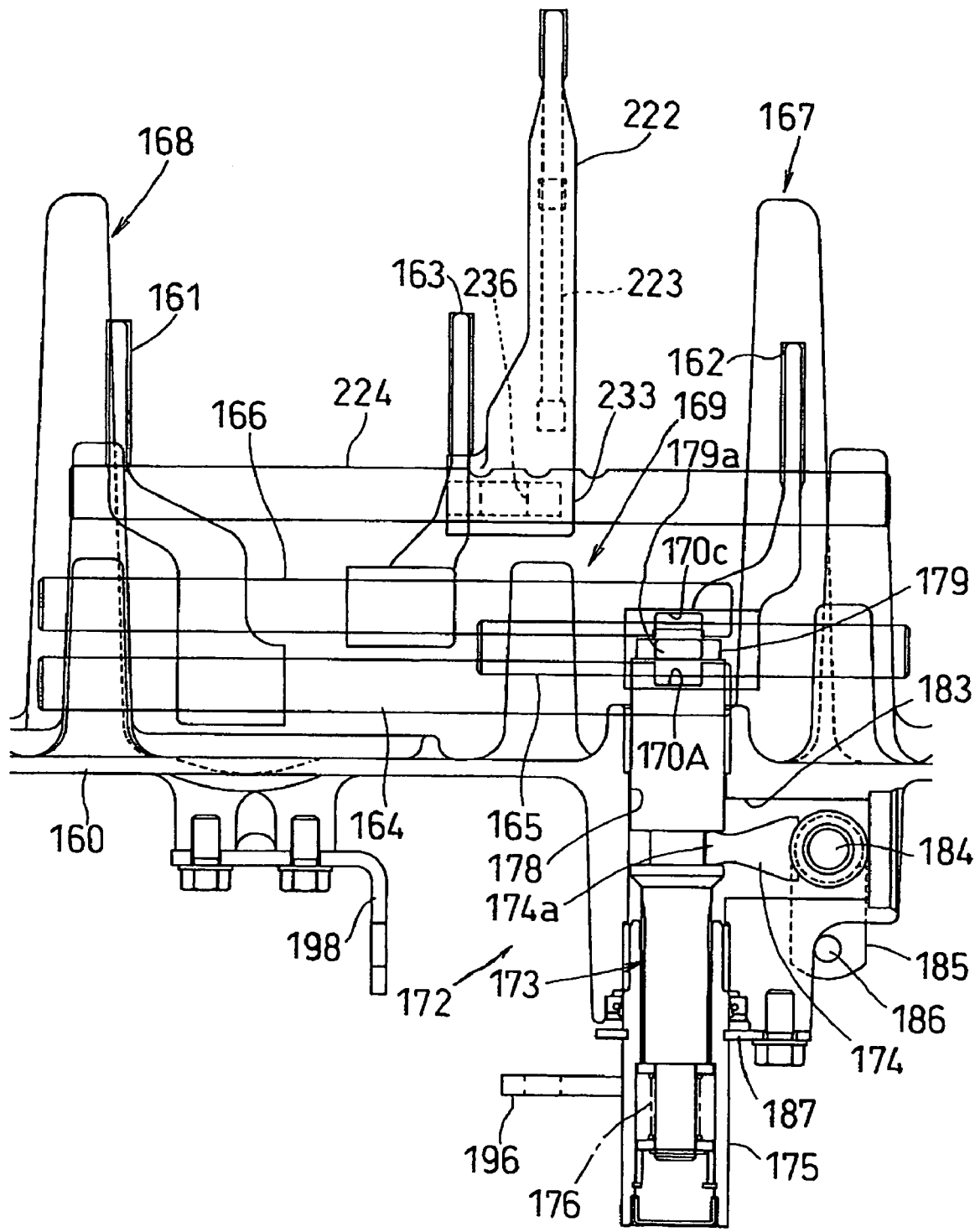
FIG. 19 is a view corresponding to FIG. 10 and showing the main change speed device for providing six speeds.
Figure 20:
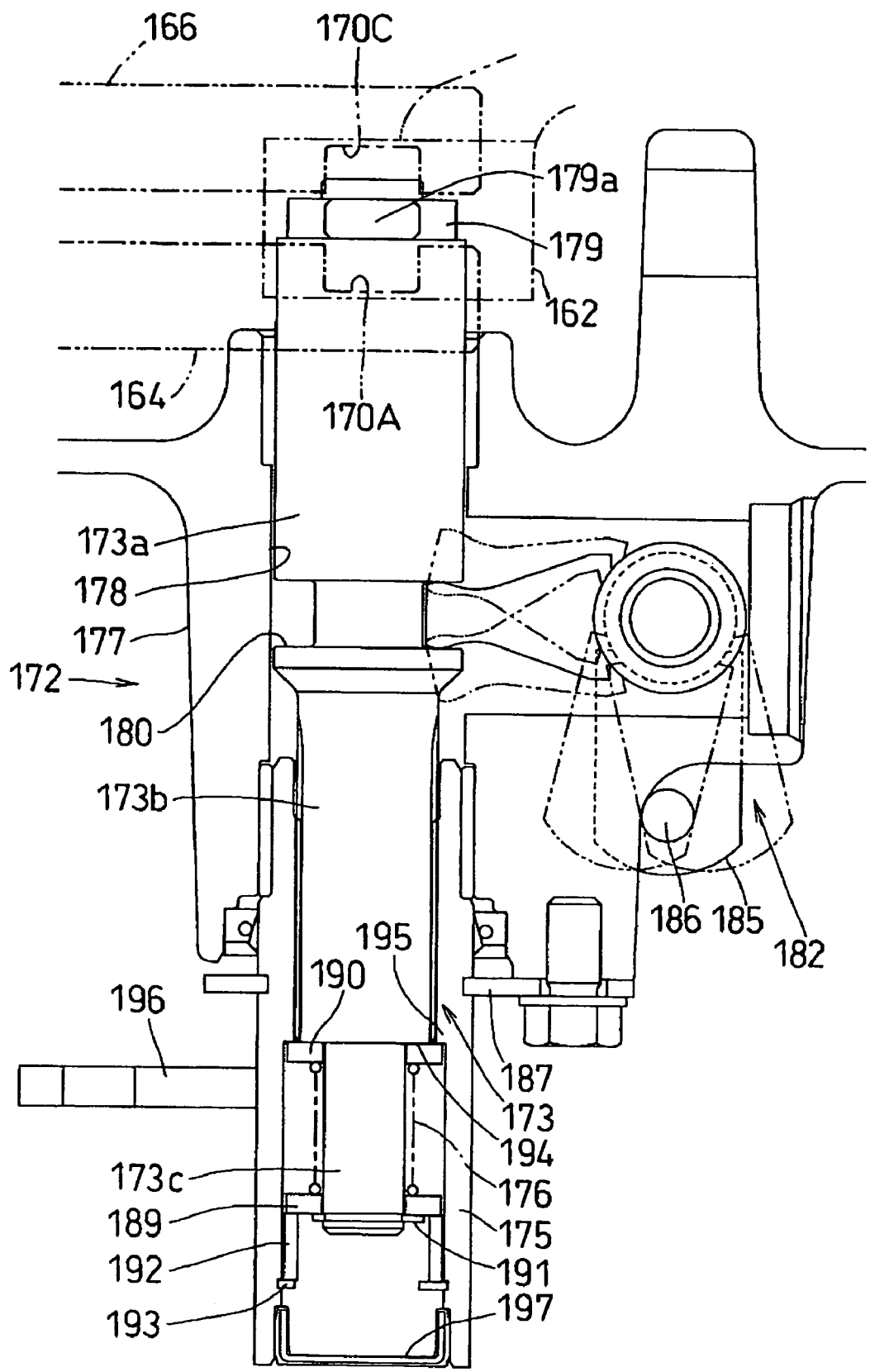
FIG. 20 is a view corresponding to FIG. 14 and showing the main change speed device for providing six speeds.

When the control shaft 173 is in the standard position, as shown in FIG. 14, the outward spring bearing 189 is biased by the return spring 176 into contact with the outward restricting member 192 and outward contact member 191. The spring bearing 190 located transversely inward (which is called an inward spring bearing) is biased by the return spring 176 into contact with a transversely outward end surface of the medium diameter portion 173b (which is a contact portion 194 for contacting the inward spring bearing 190, and is called an inward contact portion) and a shoulder on the inner periphery of the rotatable member 175 (which is a restricting portion 195 for restricting movement in the opposite direction of the inward spring bearing 190, and is called an inward restricting portion). Thus, the control shaft 173 is maintained in the standard position by the biasing force of the return spring 176.

When the control shaft 173 is moved transversely outward from the standard position in order to engage the distal end 179a of the arm 179 with the first engaging portion 170A, the inward spring bearing 190 is pressed by the inward contact portion 194 to move transversely outward while compressing the return spring 176. This permits the control shaft 173 to move transversely outward. When, in this state, the operating force for moving the control shaft 173 transversely outward is canceled, the inward spring bearing 190 is pressed by the return spring 176 to move transversely inward and return the control shaft 173 to the standard position.

A second lever member 196 is fixed to and projects radially outward and rearward from the portion of the rotatable member 175 projecting from the support 177.

The transversely outward end of the accommodation bore 188 is closed by a lid 197.

The first lever member 185 is interlocked to the main shift lever by a selector wire in the form of a push-pull wire, for example. The second lever member 196 is interlocked to the main shift lever through a link mechanism, for example. The main shift lever is rockable in one direction and in another direction perpendicular thereto. Rocking in the one direction axially moves the control shaft 173 through the first lever member 185, rotatable rod 184 and selector member 174. Rocking in the other direction rotates the control shaft 173 through the second lever member 196 and rotatable member 175.

A mounting member 198 is fixed to the outer surface of the cover 160 for attaching an outer wire of the selector wire.

As shown in FIG. 5, the auxiliary change speed device 142 is in the form of a constant mesh type change speed mechanism, and includes a high-speed gear train 201, a low-speed gear train 202 disposed rearwardly of the high-speed gear train 201, a spline boss 203 mounted (splined) on the output shaft 146 between the high-speed gear train 201 and low-speed gear trains 202 to be rotatable with the output shaft 146, and an auxiliary change speed shifter 204 mounted (splined) on the spline boss 203 to be axially movable and rotatable therewith.

The high-speed gear train 201 has a drive gear which is the driven gear 151b of the third speed gear train 151 of the main change speed device 141. Such sharing of the component contributes to compactness of the change speed device 111.

The high-speed gear train 201 has a driven gear 201b mounted on the output shaft 146 to be rotatable relative thereto. A spacer 181 is mounted on the output shaft 146 forwardly of the driven gear 201b for positioning of the driven gear 201b.

The low-speed gear train 202 has a drive gear 202a formed integrally with the counter shaft 145 between the driven gear 150b of the second speed gear train 150 and the driven gear 151b of the third speed gear train 151. The low-speed gear train 202 has a driven gear 202b mounted on the output shaft 146 to be rotatable relative thereto.

Thus, the space 140 for adding two stage gear trains to the main change speed device 141 noted hereinbefore is located in a position corresponding to the drive gear 202a of the low-speed gear train 202.

The counter shaft 145 has splines formed between the drive gear 202a of the low-speed gear train 202 and the driven gears 151b of the third gear train 151 for meshing with a gear.

Engaging portions 205 and 206 are formed on a rear part of the driven gear 201b of the high-speed gear train 201 and a front part of the driven gear 202b of the low-speed gear train 202 for meshing with the auxiliary change speed shifter 204. A non-power transmission state is provided when the auxiliary change speed shifter 204 is out of mesh with the engaging portions 205 and 206. When the auxiliary change speed shifter 204 is axially slid forward from this position into mesh with the spline boss 303 and the engaging portion 205 of the driven gear 201b of the high-speed gear train 201, the auxiliary change speed device 142 assumes a high-speed state for transmitting high-speed power of the auxiliary change speed from the counter shaft 145 to the output shaft 146 through the high-speed gear train 201, auxiliary change speed shifter 204 and spline boss 303. When the auxiliary change speed shifter 204 is axially slid rearward from the non-power transmission position into mesh with the spline boss 303 and the engaging portion 206 of the driven gear 202b of the low-speed gear train 202, the auxiliary change speed device 142 assumes a low-speed state for transmitting low-speed power of the auxiliary change speed from the counter shaft 145 to the output shaft 146 through the low-speed gear train 202, auxiliary change speed shifter 204 and spline boss 303.

The engaging portion 206 of the driven gear 202b of the low gear train 202 is formed longer than (or approximately as long as) the axial length of the auxiliary change speed shifter 204, so that the auxiliary change speed shifter 204 may be placed out of mesh with the spline boss 303. When the auxiliary change speed shifter 204 is out of mesh with the spline boss 303, the auxiliary change speed device 142 assumes neither the high-speed state nor the low-speed state. This is a creep change speed switching position C for actuating the creep change speed device 143. The auxiliary change speed shifter 204 is movable rearward (in one axial direction) from a front end of its movement range, to a high-speed position H for placing the auxiliary change speed device 142 in the high-speed state, a low-speed position L for placing the auxiliary change speed device 142 in the low-speed state, and the creep change speed switching position C for placing the auxiliary change speed device 142 in neither the high-speed state nor the low-speed state.

The auxiliary change speed shifter 204 can be retained in the high-speed position H, low-speed position L and creep change speed switching position C by a detent mechanism. The auxiliary change speed shifter 204 may be retained also in a neutral position between the high-speed position H and low-speed position L.

A creep output gear 207 is formed integrally with a rear of the low-speed gear train 202 for outputting power to the creep change speed device 143. A creep final gear 208 is disposed rearwardly of the creep output gear 207 for inputting power slowed down by the creep change speed device 143 to the output shaft 146. The creep final gear 208 is mounted on the output shaft 146 to be rotatable therewith.

The creep final gear 208 is disposed between the first speed gear train and second speed gear train of the main change speed device 141.

Considering wear and so on, it is usually preferable to dispose the first main change speed switching clutch 155 on the counter shaft 145 which rotates slower than the input shaft 144. However, the counter shaft 145 causes an increased amount of inertia, and an increased amount of synchronization. The greater reduction ratio involves the greater amount of synchronization. The first main change speed switching clutch 155 becomes radially large. Thus, it becomes impossible to dispose the creep final gear 208 of large diameter between the first speed gear train 149 and second speed gear train 150 of the main change speed device 141. The main change speed device 141, auxiliary change speed device 142 and creep change speed device 143 cannot be arranged between the pair of walls 25 and 147 of the drive case 5.

Further, the distance between the counter shaft 145 and output shaft 146 cannot be increased because of restrictions of other gears.

Thus, in this embodiment, the first main change speed switching clutch 155, which switches between the first speed and second speed of the main change speed, is mounted on the input shaft 144. The first main change speed switching clutch 155 becomes radially compact, for allowing the creep final gear 208 of large diameter to be disposed between the first speed gear train 149 and second speed gear train 150 of the main change speed device 141. The main change speed device 141, auxiliary change speed device 142 and creep change speed device 143 can be arranged between the pair of walls 25 and 147 of the drive case 5.

A drive gear 209a of a front wheel power takeoff gear train 209 is formed integrally with a rear part of the creep final gear 208. A driven gear 209b of the front wheel power takeoff gear train 209 is mounted on the front wheel main drive shaft 14 to be rotatable relative thereto. A clutch 210 is mounted on the front drive main drive shaft 14 to be slidable fore and aft for transmitting power having passed through the change speed device 111 to the front wheels.

A large part of the creep change speed devices 143 is assembled to the cover 160. By attaching the cover 160 to the clutch housing 1, the creep change speed device 143 is removably incorporated into the power transmitting system between the auxiliary change speed devices 142 and rear wheel differential 13. Thus, the specification of the change speed device 111 may be changed easily between a specification providing creep change speed in the state of the creep change speed device 143 assembled to the cover 160, and a specification providing no creep change speed in the state of the creep change speed device 143 not assembled to the cover 160.

As shown in FIGS. 5, 8, 9, 10, 11, 15 and 16, the creep change speed device 143 includes, besides the creep output gear 207 and creep final gear 208 described hereinbefore, a pair of right and left transmission shafts 211 and 212 supported between lower parts of the front and rear support walls 167 and 168 formed on the inner surface of the cover 160 to be rotatable about fore and aft axes. One (located transversely outward) of the transmission shafts 211 serves as an input transmission shaft. The other (located transversely inward) transmission shaft 212 serves as an output transmission shaft.

The creep change speed device 143 further includes a first creep change speed gear 213 mounted on an intermediate portion of the output transmission shaft 212 to be rotatable relative thereto and meshed with the creep output gear 207, a second creep change speed gear 214 formed integrally with a rear part of the first creep change speed gear 213, a third creep change speed gear 215 meshed with the second creep change speed gear 214 and mounted on the input transmission shaft 211 to be rotatable therewith, a fourth creep change speed gear 216 disposed rearwardly of the third creep change speed gear 215 and mounted on the input transmission shaft 211 to be rotatable therewith, a fifth creep change speed gear 217 meshed with the fourth creep change speed gear 216, a transmission pipe 218 mounted on the output transmission shaft 212 to be rotatable relative thereto, and having the fifth creep change speed gear 217 mounted to be rotatable therewith, a creep change speed transmission pipe 218 mounted on the transmission pipe 218 to be axially movable and rotatable therewith, and a sixth creep change speed gear 220 disposed rearwardly of the second creep change speed gear 214, meshed with the creep final gear 208, and mounted on the output transmission shaft 212 to be rotatable therewith.

The output transmission shaft 212 has an engaging portion 221 formed at a rear end of a fore and aft moving range of a creep change speed shifter 219 for meshing with the creep change speed shifter 219.

With the creep change speed device 143 having the above construction, when the creep change speed shifter 219 is meshed with the engaging portion 221, the creep change speed device 143 is placed in an operative state (creep change speed state) for transmitting power as reduced to a super-low speed. The power is then transmitted from the counter shaft 145 to the output shaft 146 through the low-speed gear train 202, creep output gear 207, first creep change speed gear 213, second creep change speed gear 214, third creep change speed gear 215, input transmission shaft 211, fourth creep change speed gear 216, fifth creep change speed gear 217, transmission pipe 218, creep change speed shifter 219, engaging portion 221, output transmission shaft 212, sixth creep change speed gear 220 and creep final gear 208. When the creep change speed shifter 219 is moved out of mesh with the engaging portion 221, the creep change speed device 143 is placed in an inoperative state not transmitting power from the input transmission shaft 211 to the output transmission shaft 212.

An auxiliary change speed shift fork 222 for moving the auxiliary change speed shifter 204 fore and aft, and a creep change speed shift fork 223 for moving the creep change speed shifter 219 fore and aft, are assembled to the cover 160. The creep change speed shift fork 223 is formed integrally with the auxiliary change speed shift fork 222. The auxiliary change speed shift fork 222 and creep change speed shift fork 223 are movable simultaneously in the same direction by one auxiliary shift lever (control lever).

A fourth change speed shift rod 224 extends between the front and rear support walls 168 of the cover 160 to be axially movable fore and aft. The auxiliary change speed shift fork 222 and creep change speed shift fork 223 are attached at proximal ends thereof to the fourth change speed shift rod 224. The auxiliary change speed shift fork 222 and creep change speed shift fork 223 are movable fore and aft by moving the shift rod 224 axially. Thus, the auxiliary change speed shift fork 222 and creep change speed shift fork 223 are movable simultaneously in one direction.

The auxiliary change speed shifter 204 and creep change speed shifter 219 may be formed separately and attached to the same shift rod, so that the auxiliary change speed shifter 204 and creep change speed shifter 219 may be moved together.

When the auxiliary change speed shifter 204 is located in the high-speed position H and low-speed position L, the creep change speed shifter 219 is out of mesh with the engaging portion 221. When the auxiliary change speed shifter 204 is located in the creep change speed switching position C, the creep change speed shifter 219 is meshed with the engaging portion 221.

Thus, by rocking the one auxiliary shift lever linearly in one direction to switch the auxiliary change speed shifter 204 to the high-speed position H, low-speed position L and creep position C, the auxiliary change speed device 142 is switched successively from high-speed state to the low-speed state and to the creep change speed state.

On the other hand, the cover 160 has a support 229 formed in a lower rear position thereof and defining a receiving bore 228 having an axis extending in the transverse direction and axially opposite ends open. A rotatable rod 230 is inserted into the receiving bore 228 of the support 229, and supported to be rotatable about the transverse axis.

The rotatable rod 230 is retained against moving transversely outward by a retainer plate 231 fixed to the outer surface of the support 229 by bolts.

The inward end of the rotatable rod 230 projects from the cover 160 into the clutch housing 1. An arm 232 projects radially outward and upward from the inward end of the rotatable rod 230. The arm 232 has a distal end (upper end) 232a thereof engaged with engaging grooves 236 formed in the proximal ends 233 of the auxiliary change speed shift fork 222 and creep change speed shift fork 223.

The transversely outward end of the rotatable rod 230 projects from the support 229. A pipe member 234 is mounted on the projecting portion and fixed thereto by a pin. A lever member 235 projects radially outward and rearward from the pipe member 234.

The lever member 235 is interlocked at a rear end thereof to an auxiliary shift lever through an interlocking mechanism.

Thus, by rocking the auxiliary shift lever, the lever member 235 is rocked up and down to rotate the rotatable rod 230 and rock the arm 232 fore and aft. Then, the auxiliary change speed shift fork 222 and creep change speed shift fork 223 move fore and aft through the fourth shift rod 224.

FIGS. 17 through 20 show a power transmission system in which the main change speed device 141 of the foregoing embodiment is modified to provide six speeds.

The illustrated main change speed device 141 includes, arranged in the space 140 noted hereinbefore, a fifth speed gear train 154, a sixth speed gear train 152, and a third main change speed switching clutch 157 for switching between these gear trains.

In this embodiment, fourth speed gear train 151, third speed gear train 150, sixth speed gear train 152, fifth speed gear train 154, second speed gear train 153 and first speed gear train 149 are arranged in the stated order from front to rear. This main change speed device 141 of the six-speed specification is constructed by adding a gear train of a gear ratio between those of the first speed gear train 149 and second speed gear trains 150, and a gear train of a gear ratio between those of the third speed gear train 151 and fourth speed gear train 152 of the main change speed device 141 of the four-speed specification described hereinbefore.

Thus, in the main change speed device 141 of the six-speed specification shown in FIGS. 17 through 20, the first speed gear train 149 has the same gear ratio as the first speed gear train 149 in the four-speed specification, the second speed gear train 153 has a gear ratio between those of the first speed gear train 149 and second speed gear train 150 in the four-speed specification, the third speed gear train 150 has the same gear ratio as the second speed gear train 150 in the four-speed specification, the fourth speed gear train 151 has the same gear ratio as the third speed gear train 151 in the four-speed specification, the fifth speed gear train 154 has a gear ratio between those of the third speed gear train 151 and fourth speed gear train 152 in the four-speed specification, and the six speed gear train 152 has the same gear ratio as the fourth speed gear train 152 of the four-speed specification.

In the main change speed device 141 of the six-speed specification, the driven gears 153b and 154b of the second speed gear train 153 and fifth speed gear train 154 are integrated into a double gear to share the engaging portion with the counter shaft 145.

In the change speed device 111 in this embodiment, the driven gear 151b of the fourth speed gear train 151 is the drive gear 151b of the high-speed gear train 201 of the auxiliary change speed device 142. The driven gear 201b of the high-speed gear train 201 has a rear part thereof formed tubular, and this tubular part defines an engaging portion 205 at the rear end thereof for meshing with the auxiliary change speed shifter 204.

The cover 160 has a third main change speed shift fork 163 for switching a power transmitting path between the fifth speed and sixth speed by engaging and axially moving the main change speed shifter (which is called a third main change speed shifter) 157b of the third main change speed switching clutch 157, and a shift rod 166 (called a third shift rod 166) for supporting the third main change speed shift fork 163. The third main change speed shift fork 163 is fixedly attached at a proximal end thereof to the third shift rod 166. The third shift rod 166 has an axis extending fore and aft, is disposed transversely inwardly of the first shift rod 164, and is supported by the rear support wall 168 and intermediate support wall 169 to be movable fore and aft.

The third shift rod 166 has an engaging portion 170C (third engaging portion) in the form of a groove, for example. The engaging portions 170A-170C are arranged transversely, with the second engaging portion 170B located between the first engaging portion 170A and third engaging portion 170C.

In this embodiment, the distal end 179a of the arm 179 is engaged with the second engaging portion 170B when the control shaft 173 is in the standard position. When the control shaft 173 is moved transversely outward (to the first moving position) from the standard position, the distal end 179a of the arm 179 engages the first engaging portion 170A. When the control shaft 173 is moved transversely inward (to the second moving position) from the standard position, the distal end 179a of the arm 179 engages the third engaging portion 170C. Thus, by moving the control shaft 173 transversely, one of the first to third main change speed shift forks 161-163 is selected.

By rotating the control shaft 173 about its axis (transverse axis) in the standard position, first moving position or second moving position, the arm 179 is rocked fore and aft about the transverse axis to move the selected one of the first to third main change speed shift forks 161-163 fore and aft.

When the control shaft 173 is moved transversely outward from the standard position in order to engage the distal end 179a of the arm 179 with the first engaging portion 170A, the inward spring bearing 190 is pressed by the inward contact portion 194 to move transversely outward while compressing the return spring 176. This permits the control shaft 173 to move transversely outward. When, in this state, the operating force for moving the control shaft 173 transversely outward is canceled, the inward spring bearing 190 is pressed by the return spring 176 to move transversely inward and return the control shaft 173 to the standard position.

When the control shaft 173 is moved transversely inward from the standard position in order to engage the distal end 179a of the arm 179 with the third engaging portion 170C, the outward spring bearing 189 is pressed by the outward contact portion 191 to move transversely inward while compressing the return spring 176. This permits the control shaft 173 to move transversely inward. When, in this state, the operating force for moving the control shaft 173 transversely inward is canceled, the outward spring bearing 190 is pressed by the return spring 176 to move transversely outward and return the control shaft 173 to the standard position.

Thus, the control shaft 173 axially movable to and from the three positions in the transverse direction can be returned the single return spring 176 to the standard position which is the middle position among the three positions.

The other aspects of the construction are the same as in the embodiment shown in FIGS. 5 through 16.

Figure 21:
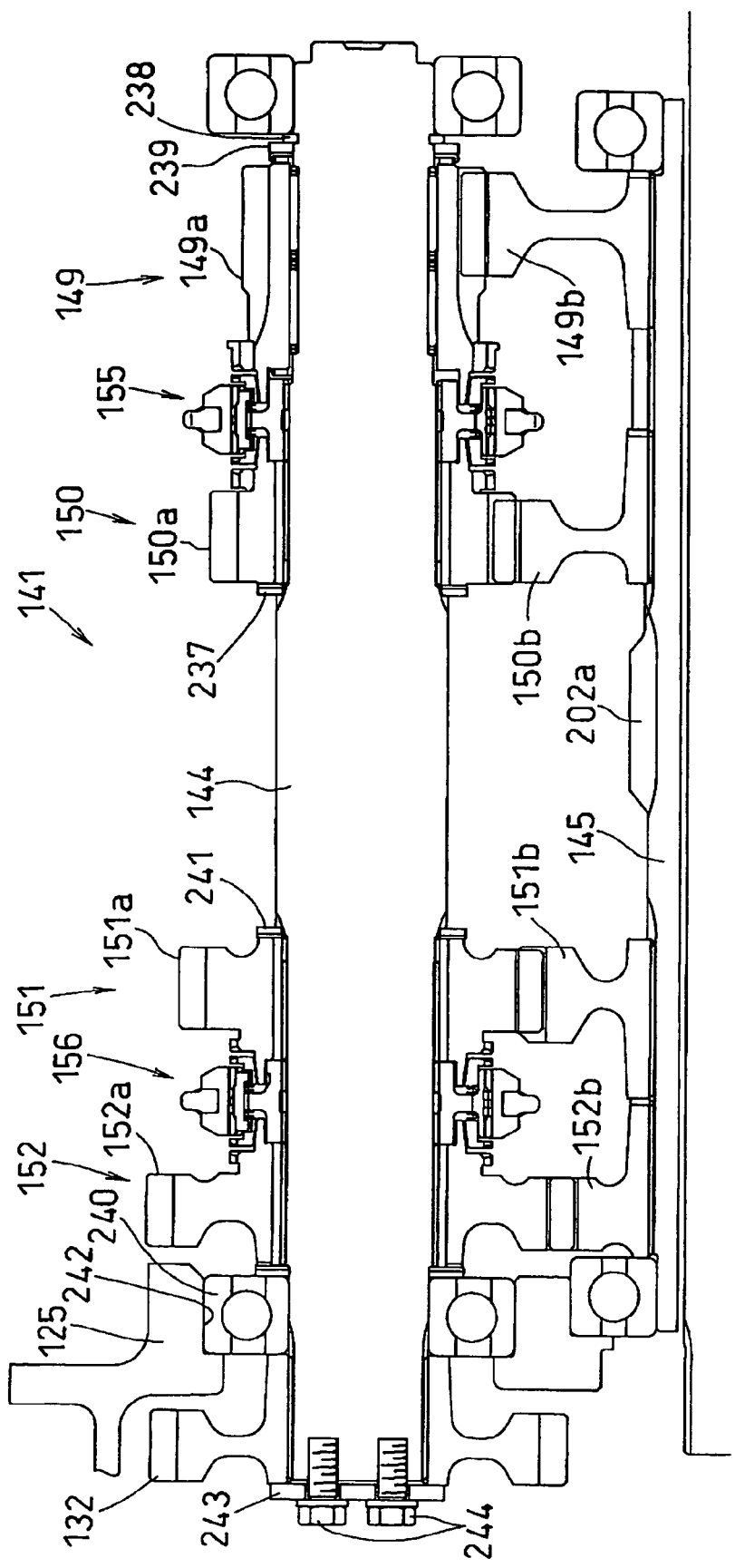
FIG. 21 is a sectional side view of a main change speed device in another embodiment.

FIG. 21 shows another embodiment intended for facilitating assembly of the drive gears of the main change speed device 141 and the first and second main change speed switching clutches 155 and 156.

In the figure, the drive gear 150a of the second speed gear train 150, the first main change speed switching clutch 155, and the drive gear 149a of the first speed gear train 149 are successively mounted in the stated order on the input shaft 144 from the rear end. A retaining ring 237 mounted on the input shaft 144 for positioning of the front end of the drive gear 150a of the second speed gear train 150. A retaining ring 238 positions the rear end of the drive gear 149a of the first speed gear train 149, and an adjusting collar 239 is placed in front of the retaining ring 238 to eliminate backlash.

On the other hand, the drive gear 151a of the third speed gear train 151, the second main change speed switching clutch 156, the drive gear 152a of the four speed gear train 152, and a bearing 240 are successively mounted in the stated order on the input shaft 144 from the front end. A retaining ring 241 is mounted on the input shaft 144 for positioning of the rear end of the drive gear 151a of the third speed gear train 151. After assembling the drive gear 151a of the third speed gear train 151, the second main change speed switching clutch 156, the drive gear 152a of the fourth speed gear train 152, and the bearing 240, the front of the input shaft 144 is inserted forward into a support bore 242 of the bearing 240 formed in the partition 25. After the inserting step, the input gear 132 is mounted on the input shaft 144 from the front end of the input shaft 144, and a retainer plate 243 that contacts the front of the input gear 132 is fixed to the front end of the input shaft 144 with bolts 244.

The retainer plate 244 is formed of a plate material such as spring steel. The bolts 244 are screwed tight to press the input gear 132 rearward with the retainer plate 244, thereby to eliminate backlash.

In this embodiment, when a change is made to a six-speed specification, the input shaft 144 also is changed.

This invention is not limited to the embodiments described above. In accordance with this invention, a main change speed device 141 for providing a plurality of speeds may be constructed to incorporate one or more additional speeds.

Next, the clutch mechanism 18 and an inertia brake mechanism 319 will be described.

The PTO drive shaft 16 transmits engine power to the PTO transmission shaft 17 through the clutch mechanism 18. The PTO transmission shaft 17 transmits power to the PTO shaft 6 extending rearward from the transmission case 3, through the PTO change speed mechanism 19. The PTO drive shaft 16 and PTO transmission shaft 17 are coaxially opposed to each other within the transmission case 3, and supported to be independently rotatable through bearings in the transmission case 3.

Figure 22:
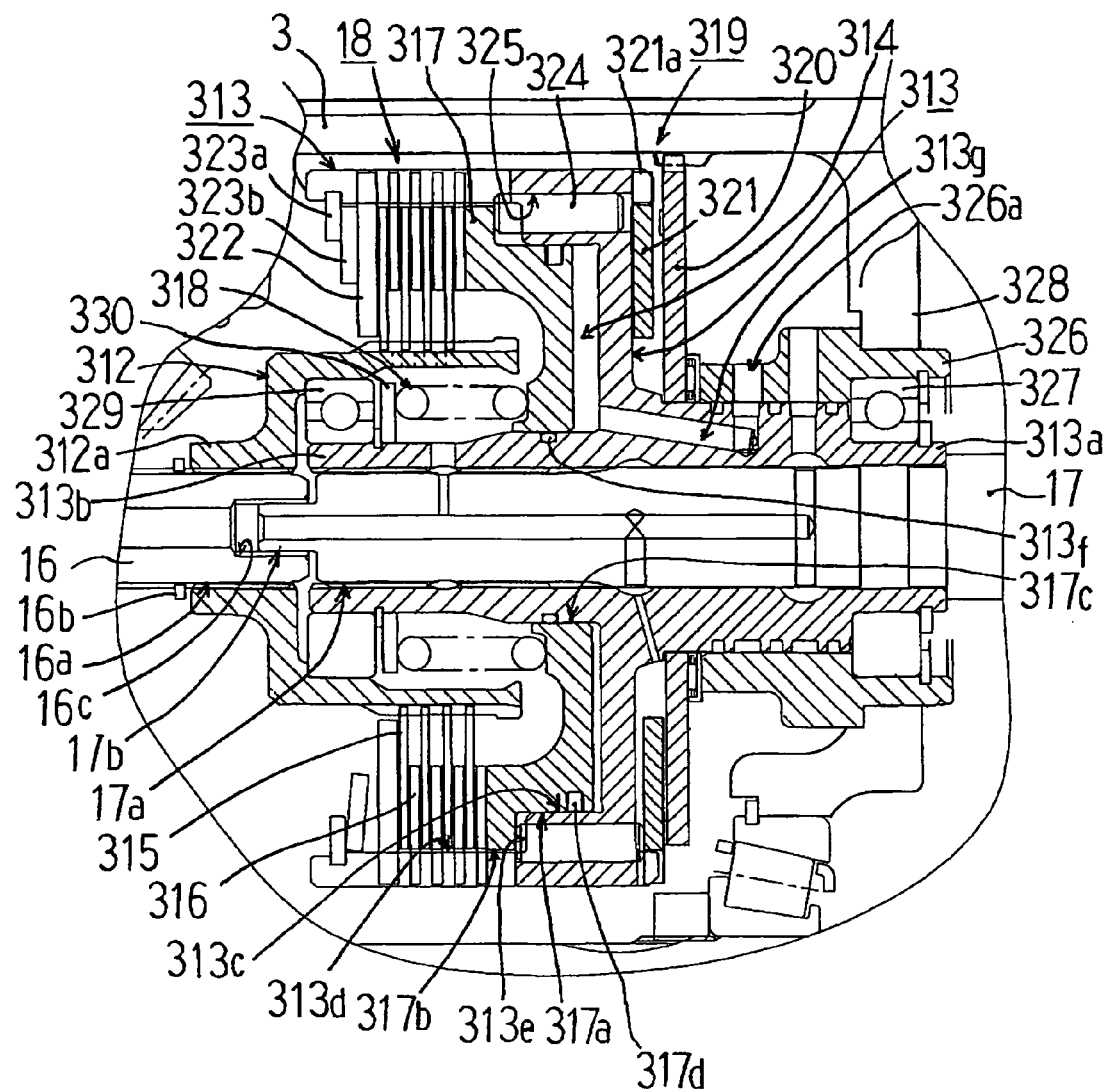
FIG. 22 is a side view in vertical section showing a principal portion of a hydraulic PTO clutch with an inertia brake mechanism according to this invention.

As shown in FIG. 22, the clutch mechanism 18 includes a disk carrier 312 connected to the PTO drive shaft 16, a clutch body 313 connected to the PTO transmission shaft 17, a clutch piston 317 slidably mounted in a cylinder chamber 314 of the clutch body 313 to be movable forward in a clutch engaging direction by a hydraulic pressure supplied to the cylinder chamber 314, to place clutch disks 315 on the disk carrier 312 and drive plates 316 on the clutch body 313 into pressure contact, thereby providing a clutch engaging state, and a clutch spring 318 for retracting the clutch piston 317 in a clutch disengaging direction with removal of the hydraulic pressure to cancel the pressure contact between the clutch disks 315 and drive plates 316, thereby providing a clutch disengaging state.

The clutch mechanism 18 has the inertia brake mechanism 319 brakes inertial rotation of the PTO transmission shaft 17 through the clutch body 313 in time of clutch disengagement. The inertia brake mechanism 319 includes a brake disk 320 fixed to the transmission case 3, and a braked plate 321 rotatable with the clutch body 313 and movable toward and away from the brake disk 320. The disk carrier 312 is cup-shaped, and has a boss portion 312a formed on the bottom of the cup shape. The boss portion 312a is splined to a spline shaft portion 16a formed peripherally of the rear end of the PTO drive shaft 16, and is positioned in the axial direction by a stopper ring 16b fixed to the spline shaft portion 16a. The disk carrier 312 has splines formed over the entire circumference and over a predetermined axial length on the outer periphery of the open end region of the cup shape. A plurality of clutch disks 315 defining projections and depressions on inner peripheral surfaces thereof for engagement with the splines are mounted on the disk carrier 312 to be axially movable relative to the carrier 312 and rotatable therewith.

The clutch body 313 is cup-shaped and has a larger diameter than the disk carrier 312. A boss portion 313a extends axially rearward from the bottom of the cup shape, and a nose sleeve 313b extends axially forward therefrom. The boss portion 313a and nose sleeve 313b are splined to a spline shaft portion 17a formed peripherally of a forward region of the PTO transmission shaft 17. The boss portion 313a has an outer peripheral surface thereof rotatably supported by an oil supply collar 326 through a bearing 327. The oil supply collar 326 is fixedly supported by a support bracket 328 of the transmission case 3.

The PTO drive shaft 16 has a small diameter axial hole 16c formed in the rear end thereof. A small diameter shank 17b at the forward end of the PTO transmission shaft 17 is rotatably inserted into the small diameter axial hole 16c. The PTO drive shaft 16 and PTO transmission shaft 17 are thereby supported coaxially. The clutch body 313 and disk carrier 312 are coaxially assembled together, with the open ends of the respective cup shapes opposed to each other, and the former covering the latter. The nose sleeve 313b of the clutch body 313 extends into the cup shape of the disk carrier 312. The forward end of the nose sleeve 313b is rotatably supported in the cup shape of the disk carrier 312 through a bearing 329.

The cup-shaped portion of the clutch body 313 includes a small diameter inner peripheral surface 313c and a large diameter inner peripheral surface 313d, the former located adjacent the bottom and the latter adjacent the open end. In the large diameter inner peripheral surface of the clutch body 313 has splines formed over the entire circumference and over a predetermined axial length adjacent the open end. A plurality of drive plates 316 defining projections and depressions on outer peripheral surfaces thereof for engagement with the splines are mounted in the clutch body 313 to be axially movable relative to the clutch body 313 and rotatable therewith. The plurality of clutch disks 315 and the plurality of drive plates 316 are arranged alternately in the axial direction.

A pressure plate 322 is splined, as are the drive plates 316, at the open end of the large diameter inner peripheral surface 313d of the clutch body 313 to be axially movable relative to the clutch body 313 and rotatable therewith through a stopper ring 323a and a plate spring 323b. Pin support bores 325 for supporting pins 324 axially extend through a shoulder surface 313e at the boundary between the large diameter inner peripheral surface 313d and small diameter inner peripheral surface 313c of the clutch body 313. A plurality of (three in the illustrated example) such pin support bores 325 are arranged at equal intervals in the circumferential direction.

The clutch piston 317 has a small diameter outer peripheral surface 317a and a large diameter outer peripheral surface 317b corresponding to the small diameter inner peripheral surface 313c and large diameter inner peripheral surface 313d of the clutch body 313. An inner peripheral surface 317c of the clutch piston 317 is slidably fitted on the nose sleeve 313b of the clutch body 313. An annular seal 317d such as an O-ring is mounted on a part of the small diameter outer peripheral surface 317a of the clutch piston 317 to maintain gastightness with the small diameter inner peripheral surface 313d of the clutch body 313. An annular seal 313f such as an O-ring is mounted on a part of the outer peripheral surface of the nose sleeve 313b to maintain gastightness with the inner peripheral surface 317c of the clutch piston 317.

With this construction, the cylinder chamber 314 in which the clutch piston 317 is slidably mounted is maintained gastight to prevent oil leaks. Hydraulic pressure is supplied to the cylinder chamber 314 through an oil port 326a formed in the oil supply collar 326 and an oil passage 313g formed in the boss portion 313a of the clutch body 313. The supply and removal of hydraulic pressure to/from the cylinder chamber 314 are carried out through a control valve from a pump not shown. The clutch spring 318 is in the form of a compression coil spring mounted in the cup-shape portion of the disk carrier 312 to extend between a spring seat 330 mounted adjacent the forward end of the nose sleeve 313b and an end surface of the clutch piston 317.

Figure 23:
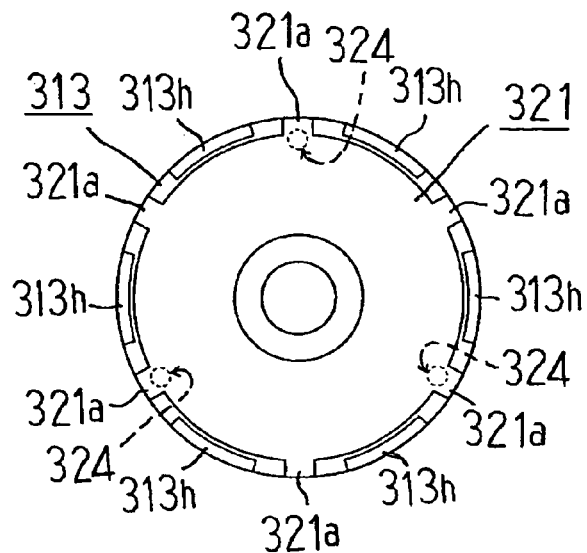
FIG. 23 is a front view showing an engaging structure of a clutch body and a braked plate in FIG. 22.

The brake disk 320 of the inertia brake mechanism 319 is in the form of a disk-like plate fixedly supported at peripheral positions thereof by a part of the transmission case 3, and loosely and coaxially fitted on the peripheral surface of the boss portion 313a of the clutch body 313. The brake disk 320 has an end surface in the axial direction of an inner periphery thereof contacting and supported by a front end in the axial direction of the oil supply collar 326 fixedly supported by the support bracket 328. As shown in FIGS. 22 and 23, the braked plate 321 is in the form of a disk-like plate similar to the brake disk 320, and has lugs 321a arranged at equal intervals in the circumferential direction. The clutch body 313 has, on an outer surface at the bottom end of the cup-shaped portion, lugs 313h arranged at equal intervals in the circumferential direction and corresponding to the lugs 321a of the braked plate 321. By engaging the lugs 321a of the braked plate 321 and the lugs 313h of the clutch body 313, the braked plate 321 is axially movable relative to the clutch body 313 on the same axis as the clutch body 313, and rotatable with the clutch body 313. With this construction, the braked plate 321 is movable relative to the clutch body 313 toward and away from the brake disk 320 and rotatable with the clutch body 313.

Brake lining is attached to one or both of the contact surfaces of the brake disk 320 and braked plate 321. The pins 324 are not connected to the clutch piston 317 or the braked plate 321. The pins 324 are sidably supported in the pin support bores 325 of the clutch body 313 for contacting the clutch piston 317 and the braked plate 321 in time of clutch disengagement, to transmit the force of the clutch spring 318 to the braked plate 321 through the clutch piston 317, to press the braked plate 321 upon the brake disk 320.

When hydraulic pressure is supplied to the cylinder chamber 314 to move the clutch piston 317 in the clutch engaging direction, an axial gap is formed between the pins 325 and the contact surface of the clutch piston 317. Thus, these pins 325 have a function to free the braked plate 321 from the force of the clutch spring 318, thereby to cancel its pressure contact with the brake disk 320, that is a function to cancel the force of braking the PTO transmission shaft 17. The pins 325 have a longer axial length than the pin support bores 325 so that, in time of clutch disengaging operation, the pins 324 project from than the pin support bores 325 to the braked plate 321 to press the braked plate 321 upon the brake disk 320. An amount of projection from the pin support bores 325 of the pins 324 is set by taking a distance of axial movement of the braked plate 321 with respect to the brake disk 320, and substantially corresponds to the distance of axial movement of the braked plate 321, for example.

The positions where the pins 324 are supported, i.e. the positions where the pin support bores 325 are formed in the clutch body 313, are positions radially outward of the cylinder chamber 314 and corresponding to outer peripheries of the clutch piston 317. These positions correspond to the boundary (end surface of the large diameter portion of the clutch piston 317) between the small diameter peripheral surface 317a and large diameter peripheral surface 317b of the clutch piston 317. Further, the positions where the pins 324 are supported correspond to the lugs 321a of the braked plate 321. This arrangement allows for a large radial wall thickness between the cylinder chamber 314 and pin support bores 325, without enlarging the outside diameter of the clutch body 313 or without diminishing the inside diameter of the cylinder chamber 314.

In the hydraulic PTO clutch with the inertia brake mechanism having the above construction according to this invention, when hydraulic pressure force is not supplied to the cylinder chamber 314, the clutch piston 317 is pushed and moved to the bottom of the cup shape of the clutch body 313 by the force of the clutch spring 318, to cancel the pressure contact between the clutch disks 315 and drive plates 316, thereby to maintain the clutch disengaging state. In this state, the braked plate 321 is pressed by the force of the clutch spring 318 toward the brake disk 320 through the clutch piston 317 and pins 324, to maintain a braking state. Therefore, power is not transmitted to the PTO transmission shaft 17.

When hydraulic pressure is supplied to the cylinder chamber 314, the clutch piston 317 is pushed and moved to the open end of the cup shape of the clutch body 313 against the force of the clutch spring 318, to press the clutch disks 315 and drive plates 316 to the pressure plate 322, to provide the clutch engaging state. In this state, the braked plate 321 is released from the pressure contact with the clutch piston 317 and pins 324 to separate from the brake disk 320 and become rotatable. Consequently, power is transmitted from the PTO drive shaft 16 to the PTO transmission shaft 17. When the hydraulic pressure is removed from the cylinder chamber 314, the clutch piston 317 is pushed and moved to the bottom of the cup shape of the clutch body 313 by the force of the clutch spring 318 to cancel the pressure contact between the clutch disks 315 and drive plates 316, thereby to provide the clutch disengaging state. The braked plate 321 is pressed toward the brake disk 320 through the clutch piston 317 and pins 324. The PTO transmission shaft 17 is braked through the braked plate 321 and clutch body 313. Thus, inertia rotation of the PTO transmission shaft 17 is braked.

Figure 24:
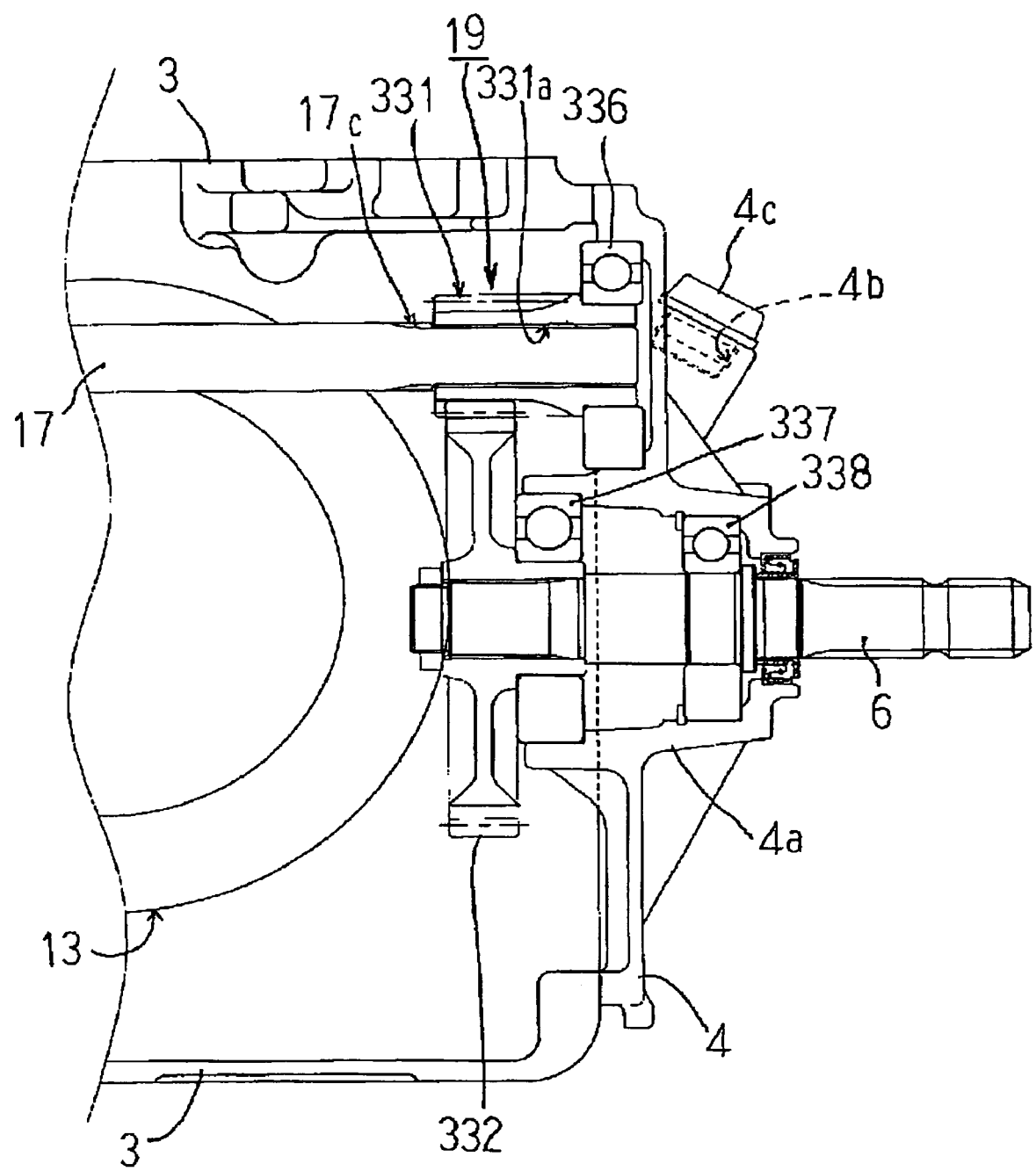
FIG. 24 is a side view in vertical section of an entire transmission mechanism of a tractor according to this invention.

The above embodiment illustrates the case where the hydraulic PTO clutch with the inertia brake mechanism of this invention is applied to the propelling transmission of a tractor. This invention is applicable also to a general-purpose clutch that makes and breaks torque transmission between a drive shaft and a driven shaft coaxially opposed to each other. Next, a bearing structure of the PTO change speed mechanism 19 applied to the propelling transmission of the above tractor will be described. As shown in FIG. 24, the PTO change speed mechanism 19 is mounted on the end cover 4 at the rear end of the transmission case 3, with transmission gears 331 and 332 meshed with each other for outputting power in a varied speed from the PTO transmission shaft 17 to the PTO shaft 6.

Conventionally, one transmission gear 331 is formed integrally with a stub shaft (not shown), and the forward end of the stub shaft and the rear end of the PTO transmission shaft 17 are connected through a coupling shaft joint (not shown). The stub shaft is supported at both sides of the transmission gear 331 by the end cover 4. The other transmission gear 332 also is conventionally supported in two positions by the end cover 4. Therefore, the end cover 4 conventionally has a double wall structure having support walls (not shown) formed parallel to each other at both sides of the transmission gears 331 and 332. Thus, the conventional bearing structure of the PTO change speed mechanism 19 is complicated and has a large number of components, which hamper cost reductions.

In this invention, in order to improve the drawback described above, as shown in FIG. 24, the transmission gears 331 and 332 are supported by the end cover 4 with a cantilever structure, and the end cover 4 has a single wall structure. The transmission gear 331 defines a spline axial bore 331a, in place of the conventional stub shaft. A spline shaft portion 17c at the rear end of the PTO transmission shaft 17 is inserted into the spline axial bore 331a. The transmission gear 331 is supported at the rear end thereof in a cantilever mode by the end cover 4 through one bearing 336. The PTO shaft 6 is rotatably supported in axially spaced apart positions thereof through bearings 337 and 338 by a bearing sleeve 4a mounted centrally of the end cover 4. The bearing sleeve 4a in the end cover 4 to project axially inward and outward therefrom. The transmission gear 332 is fixed by a fastening nut 339 to the inward end of the PTO shaft 6 supported through bearings 337 and 338 by the bearing sleeve 4a to extend inward and outward through the end cover 4. With the above construction, the transmission gear 332 is supported as cantilevered by the bearing sleeve 4a of the end cover 4, in the position projecting inward from the bearing sleeve 4a. The end cover 4 has an oil supply port 4b formed in an upper position directed as directed obliquely upward, with an operable cap 4c attached to the supply port 4b.

As described above, the rear end of the PTO transmission shaft 17 is directly spline-fitted to the transmission gear 331 of the PTO change speed mechanism 19, thereby omitting the stub shaft of the transmission gear 331. The transmission gears 331 and 332 are supported with the cantilever structure by the end cover 4, thereby allowing the end cover 4 to have a single wall structure. Since the number of components is reduced in this way, the bearing structure of the PTO change speed mechanism 19 is simplified and reduced in cost. Next, a pump power takeoff construction attached in the transmission case 3 will be described. This construction acts as a hydraulic pressure supply device for power steering of the tractor, and as a hydraulic pressure supply device for driving a three-point link hitch mechanism attached to the rear of the tractor.

Conventionally, pump power is taken from a PTO main drive shaft in constant rotation by using three spur gears (not shown). That is, conventionally, a pump input shaft (not shown) is disposed parallel to the PTO main drive shaft, with an intermediate shaft (not shown) disposed between the two shafts. Spur gears are mounted on these three shafts, respectively, to drive the pump. In this case, the gear mounted on the pump input shaft, and the gear mounted on the intermediate shaft are rotatably attached to a mounting case (not shown). A pump body (not shown) is attached to one side surface of the mounting case, and a side surface perpendicular to the above side surface is attached to a side surface of a transmission case.

Figure 25:
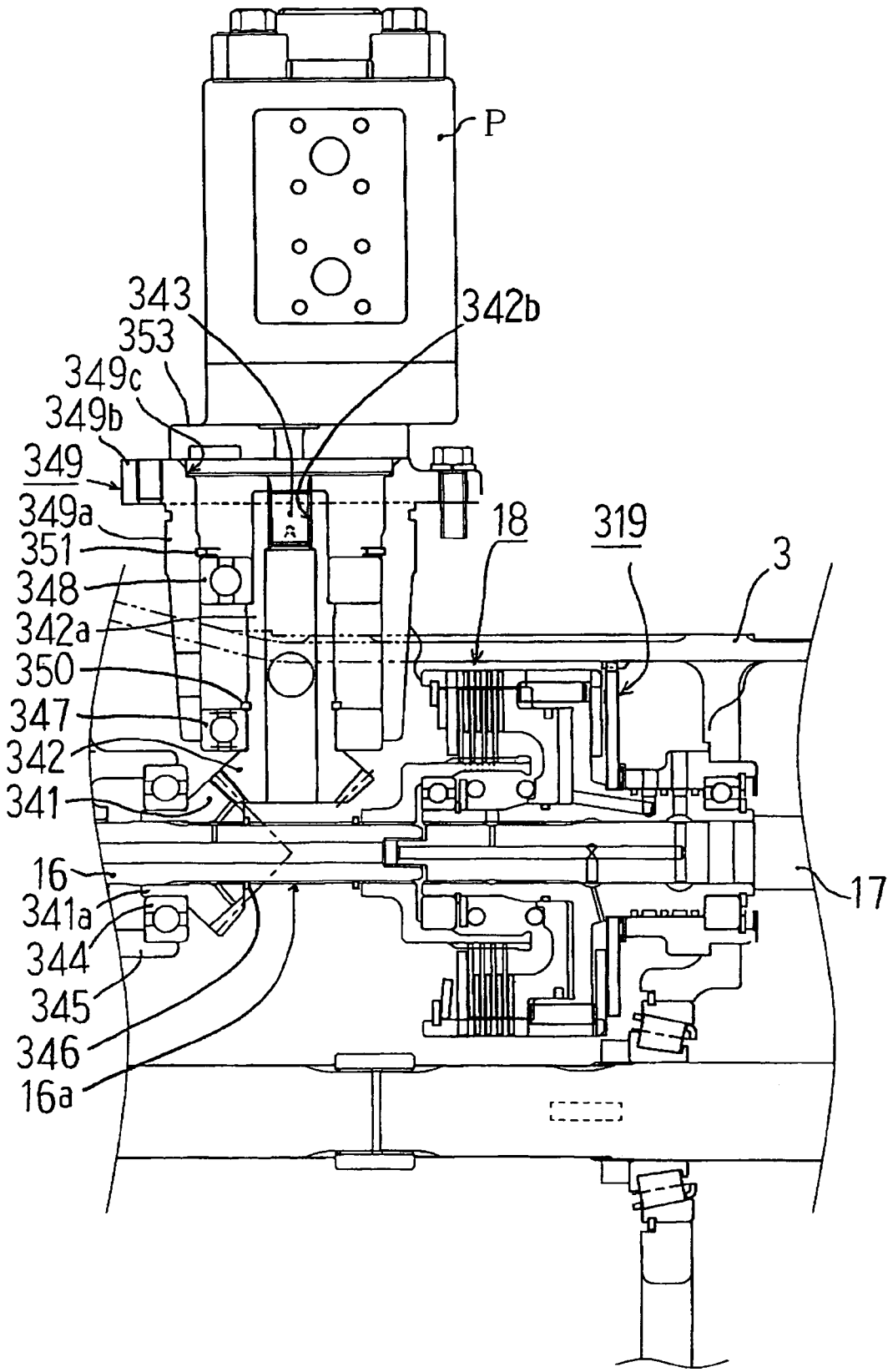
FIG. 25 is a side view in vertical section showing a principal portion of a pump power takeoff device.

Thus, the conventional pump power takeoff structure has a large number of components and is complicated, which hamper cost reductions. In this invention, as shown in FIG. 25, a pair of bevel gears 341 and 342 take power from the PTO drive shaft 16 to rotate a pump input shaft 443. In this case, a pump power takeoff position is between a support bracket 345 of the transmission case 3 rotatably supporting a rear end region of the PTO drive shaft 16 through a bearing 344, and the position of the clutch mechanism 18.

One of the bevel gears 341 has a boss portion 341a in the form of a short tubular shaft extending in one axial direction. The boss portion 341a is fitted on a spline shaft portion 16a formed peripherally at the rear end of the PTO drive shaft 16, rotatably supported by a support tube 345 of the transmission case 3 through a bearing 344, and axially positioned by a stopper ring 346 fitted on the PTO drive shaft 16. The other bevel gear 342 a boss portion 342a of hollow shaft structure extending in one axial direction. This boss portion 342a is rotatably supported in two axially spaced apart positions thereof through bearings 347 and 348 by a mounting case 349, and axially positioned by locating rings 350 and 351. Spline grooves 342b are formed in an inner peripheral surface at an end of the boss portion 342a, and a pump input shaft 343 is splined to the spline grooves 342b.

The mounting case 349 has a cylindrical portion 349a, an outer mounting flange 349b formed peripherally of an end of the cylindrical portion 349a to extend radially outward, a pump mount 349c formed by countersinking the inner periphery at the end of the cylindrical portion 349a. The pump mount 349c receives a mounting flange 353 of a pump body P bolted thereto. The outer mounting flange 349b is bolted to a bearing surface (not shown) on a side surface of the transmission case 3. The bearing surface (not shown) of the transmission case 3 has an opening for receiving the cylindrical portion 349a.

Figure 26:
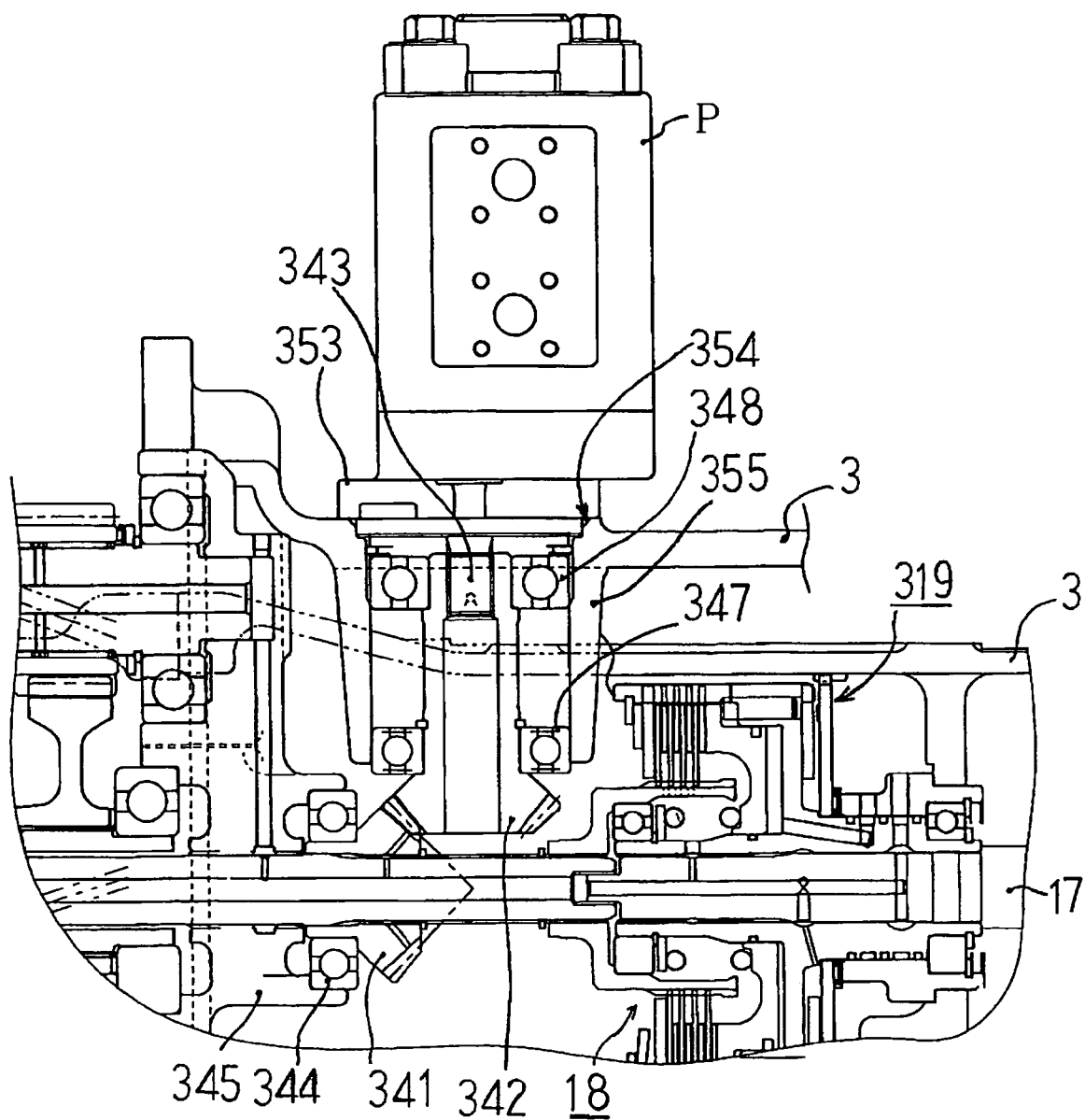
FIG. 26 is a side view in vertical section showing a principal portion of a pump power takeoff device which is a modification of what is shown in FIG. 25.

In this case, the pump input shaft 343 is attached in the side surface of the transmission case 3 to extend perpendicular to the PTO drive shaft 16. With the above construction, the pump power takeoff structure has a reduced number of components, and a simplified construction, to realize a cost reduction. FIG. 26 shows another embodiment of the pump power takeoff structure, which omits the mounting case 349, and has the mounting flange 353 of the pump body P attached directly to the bearing surface 354 on the side surface of the transmission case 3. In this case, the bearing surface 354 on the side surface of the transmission case 3 has a cylindrical portion 355 formed integrally therewith for rotatably supporting the bevel gear 342 connected to the pump input shaft 343. The bevel gear 342 is rotatably assembled to the cylindrical portion 355 through bearings 347 and 348. The other aspects of construction are the same as in FIG. 25.

The above construction further simplifies the pump power takeoff structure, with the number of components further reduced to achieve a further cost reduction.

What is claimed is:
1. A transmission for a tractor comprising:
 a change speed device operable, when an engine of the tractor and said transmission are connected, to transmit, in varied speeds, power from said engine to driving wheel;
 a main drive shaft for receiving the power from said engine when the engine of the tractor and the transmission are connected; and
 a reverse and forward drive switching device adapted to be disposed between said engine and said change speed device when the engine of the tractor and the transmission are connected and operable to switch a direction of rotation of the power from said engine, said reverse and forward drive switching device being shiftable between a high-speed forward drive position, a low-speed forward drive position, and a reverse drive position, and including:
  a high-speed forward drive clutch mounted to said main drive shaft for switching said reverse and forward drive switching device to the high-speed forward drive position;
  a low-speed forward drive clutch mounted to said main drive shaft for switching said reverse and forward drive switching device to the low-speed forward drive position; and
  a reverse drive clutch mounted to said main drive shaft for switching said reverse and forward drive switching device to the reverse drive position;
  a first input gear;
  a second input gear;
  a high-speed forward drive output gear meshed with said first input gear for receiving forward drive through the high-speed forward drive clutch, and transmitting high-speed forward drive to the change speed device;
  a low-speed forward drive output gear meshed with said second input gear for receiving forward drive through the low-speed forward drive clutch, and transmitting low-speed forward drive to the change speed device; and
  a reverse drive transmission gear meshed with one of said first input gear and said second input gear for receiving reverse drive through the reverse drive clutch, and transmitting reverse drive to the change speed device.

2. A transmission for a tractor as defined in claim 1, further comprising:
 a reverse drive transmission shaft disposed below said main drive shaft and extending parallel thereto; and
 an input shaft for rotatably supporting said first input gear and said second input gear, and inputting power to the change speed device, said input shaft being disposed laterally from a position between said main drive shaft and said reverse drive transmission shaft, and extending parallel to said main drive shaft.

3. A transmission for a tractor as defined in claim 1, wherein said main drive shaft has said high-speed forward drive output gear, said low-speed forward drive output gear and a reverse drive output gear rotatably mounted thereon.

4. A transmission for a tractor as defined in claim 3, further comprising a reverse drive transmission shaft having a reversing gear and said reverse drive transmission gear rotatably mounted thereon, said reversing gear being meshed with said reverse drive output gear for reversing the direction of rotation.

5. A transmission for a tractor as defined in claim 1, further comprising:
 a shuttle valve for selectively supplying pressure oil either to said high-speed forward drive clutch and said low-speed forward drive clutch or to said reverse drive clutch; and a high-speed and low-speed change valve disposed between:

i) said shuttle valve, and ii) said high-speed forward drive clutch and said low-speed forward drive clutch, for selectively supplying pressure oil to one of said high-speed forward drive clutch and said low-speed forward drive clutch.

6. A transmission for a tractor as defined in claim 1, wherein said change speed device is disposed between a pair of walls spaced in a forward-and-rearward direction, said change speed device including:

a main change speed device; and an auxiliary change speed device.

7. A transmission for a tractor as defined in claim 6, said change speed device has a creep change speed device detachably assembled thereto.

8. A transmission for a tractor as defined in claim 1, further comprising:

a first wall disposed forwardly of and supporting said reverse and forward drive switching device;

a second wall disposed between and supporting said reverse and forward drive switching device and said change speed device;

a third wall disposed rearwardly of said change speed device; and a power takeoff shaft disposed rearwardly of said third wall.

* * * * *